(12) United States Patent
Selbrede et al.

(10) Patent No.: US 8,014,057 B2
(45) Date of Patent: Sep. 6, 2011

(54) EXTENDING THE GAMUT COLOR GENERATION IN A DISPLAY

(75) Inventors: Martin G. Selbrede, The Woodlands, TX (US); Daniel K. Van Ostrand, The Woodlands, TX (US); Lynn Essman, The Woodlands, TX (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 12/420,979

(22) Filed: Apr. 9, 2009

(65) Prior Publication Data

US 2009/0262129 A1 Oct. 22, 2009

Related U.S. Application Data

(63) Continuation of application No. 11/671,087, filed on Feb. 5, 2007, now Pat. No. 7,522,354, which is a continuation of application No. 11/430,576, filed on May 8, 2006, now Pat. No. 7,515,326, which is a continuation of application No. 10/506,042, filed as application No. PCT/US03/05736 on Feb. 26, 2003, now Pat. No. 7,042,618.

(60) Provisional application No. 60/359,600, filed on Feb. 26, 2002, provisional application No. 60/359,601, filed on Feb. 26, 2002, provisional application No. 60/359,766, filed on Feb. 26, 2002, provisional application No. 60/359,755, filed on Feb. 26, 2002, provisional application No. 60/359,777, filed on Feb. 26, 2002, provisional application No. 60/359,783, filed on Feb. 26, 2002.

(51) Int. Cl.
*G02F 1/01* (2006.01)

(52) U.S. Cl. .......................................... 359/276; 345/88
(58) Field of Classification Search ................... 359/276
See application file for complete search history.

(56) References Cited

U.S. PATENT DOCUMENTS

| | | |
|---|---|---|
| 4,018,608 A | 4/1977 | Frazier |
| 4,679,068 A | 7/1987 | Lillquist et al. |
| 4,682,029 A | 7/1987 | Diepeveen et al. |
| 4,751,571 A | 6/1988 | Lillquist |

(Continued)

FOREIGN PATENT DOCUMENTS

CA 1311822 12/1992

(Continued)

OTHER PUBLICATIONS

Foreign Office Action in International Application No. 10-2006-7005594 mailed Mar. 17, 2008, 6 pages.

*Primary Examiner* — Ricky Mack
*Assistant Examiner* — James Jones
(74) *Attorney, Agent, or Firm* — Renner, Otto, Boisselle & Sklar, LLP

(57) ABSTRACT

In a display system, a color gamut of the displayed images is extended by adding one or more primary colors lying outside a tristimulus color space triangle to a Red, Green, Blue (RGB) system, modulating light emitted by both light sources lying inside the tristimulus color space triangle and light sources lying outside the tristimulus color space triangle, and adding a non-tristimulus vertex to construct an extended-gamut polygon. The display system adds one or more primary colors to the RGB system, which lie outside the tristimulus color space triangle but within a CIE (International Commission on Illumination) color space.

14 Claims, 14 Drawing Sheets

U.S. PATENT DOCUMENTS

| | | | |
|---|---|---|---|
| 4,843,573 A | 6/1989 | Taylor et al. |
| 4,967,276 A | 10/1990 | Murakami et al. |
| 4,985,853 A | 1/1991 | Taylor et al. |
| 5,016,985 A | 5/1991 | Kalmanash et al. |
| 5,035,472 A | 7/1991 | Hansen |
| 5,122,791 A | 6/1992 | Gibbons et al. |
| 5,148,744 A | 9/1992 | Chiang |
| 5,162,928 A | 11/1992 | Taniguchi et al. |
| 5,305,119 A | 4/1994 | Rolleston et al. |
| 5,319,491 A | 6/1994 | Selbrede |
| 5,334,992 A | 8/1994 | Rochat et al. |
| 5,367,387 A | 11/1994 | Yamaguchi |
| 5,390,596 A | 2/1995 | Farr |
| 5,483,360 A | 1/1996 | Rolleston et al. |
| 5,497,266 A | 3/1996 | Owen |
| 5,502,458 A | 3/1996 | Braudaway et al. |
| 5,526,172 A | 6/1996 | Kanack |
| 5,528,386 A | 6/1996 | Rolleston et al. |
| 5,544,268 A | 8/1996 | Bischel et al. |
| 5,596,671 A | 1/1997 | Rockwell, III |
| 5,603,328 A | 2/1997 | Zucker et al. |
| 5,614,925 A | 3/1997 | Braudaway et al. |
| 5,667,474 A | 9/1997 | Nishimura |
| 5,710,824 A | 1/1998 | Mongeon |
| 5,712,658 A | 1/1998 | Arita et al. |
| 5,729,336 A | 3/1998 | Prettyjohns et al. |
| 5,734,368 A | 3/1998 | Meyers et al. |
| 5,754,448 A | 5/1998 | Edge et al. |
| 5,910,816 A | 6/1999 | Fontenot et al. |
| 5,963,201 A | 10/1999 | McGreggor et al. |
| 5,999,307 A | 12/1999 | Whitehead et al. |
| 6,034,752 A | 3/2000 | Khan et al. |
| 6,196,845 B1 | 3/2001 | Streid |
| 6,252,636 B1 * | 6/2001 | Bartlett ........................ 348/743 |
| 6,293,911 B1 | 9/2001 | Imaizumi et al. |
| 6,297,582 B1 | 10/2001 | Hirota et al. |
| 6,307,663 B1 | 10/2001 | Kowarz |
| 6,307,966 B1 | 10/2001 | Chapin |
| 6,313,982 B1 | 11/2001 | Hino |
| 6,332,690 B1 | 12/2001 | Murofushi |
| 6,377,321 B1 | 4/2002 | Khan et al. |
| 6,381,037 B1 | 4/2002 | Balasubramanian et al. |
| 6,438,282 B1 | 8/2002 | Takeda et al. |
| 6,441,923 B1 | 8/2002 | Balasubramanian et al. |
| 6,476,391 B1 | 11/2002 | Zhang |
| 6,520,648 B2 | 2/2003 | Stark et al. |
| 6,648,475 B1 | 11/2003 | Roddy et al. |
| 6,654,080 B1 | 11/2003 | Khan et al. |
| 6,680,579 B2 | 1/2004 | Allen et al. |
| 6,811,267 B1 | 11/2004 | Allen et al. |
| 6,829,394 B2 | 12/2004 | Hiramatsu |
| 6,870,523 B1 * | 3/2005 | Ben-David et al. ............. 345/84 |
| 7,042,618 B2 | 5/2006 | Selbrede et al. |
| 7,092,142 B2 | 8/2006 | Selebrede et al. |
| 7,198,393 B2 | 4/2007 | Tubidis et al. |
| 7,268,757 B2 | 9/2007 | Ben-David et al. |
| 7,270,458 B2 | 9/2007 | Kuo et al. |
| 2003/0011613 A1 * | 1/2003 | Booth, Jr. ...................... 345/589 |

FOREIGN PATENT DOCUMENTS

| | | |
|---|---|---|
| CA | 2410955 | 12/2001 |
| EP | 1403055 | 3/2004 |

* cited by examiner

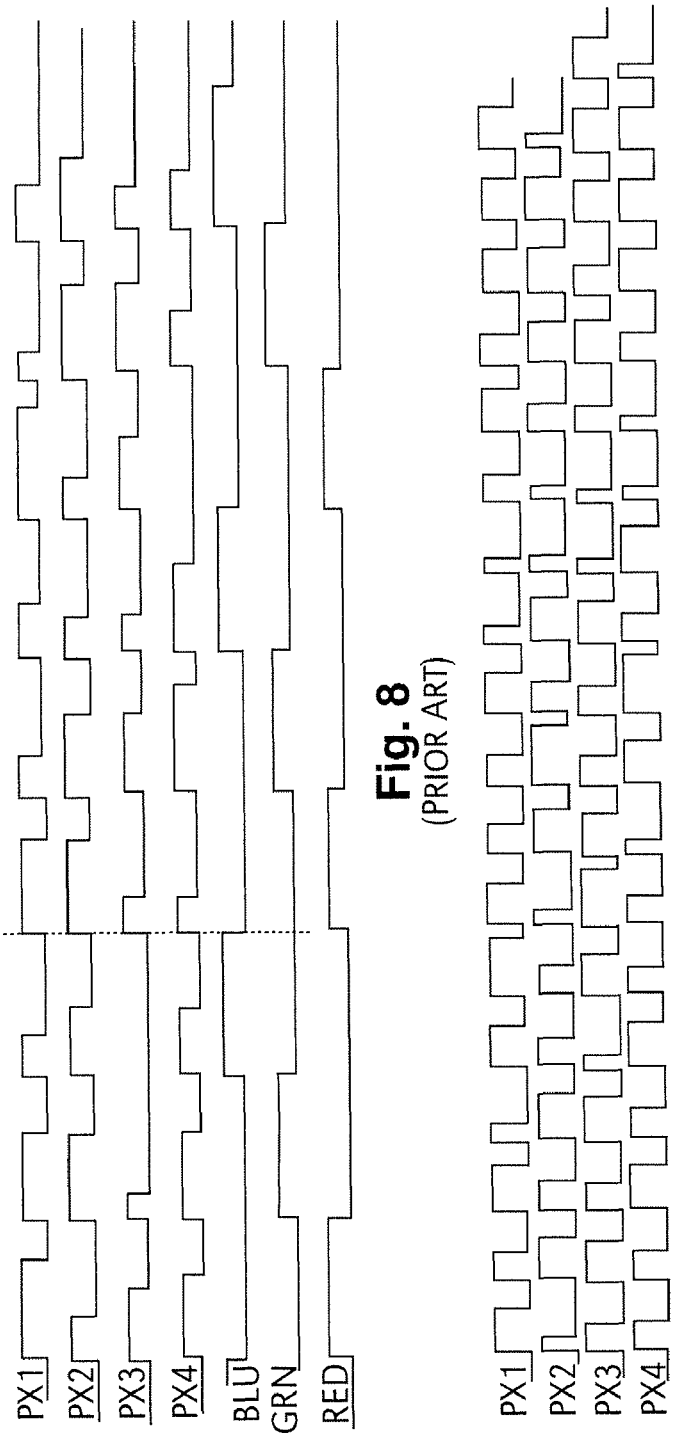
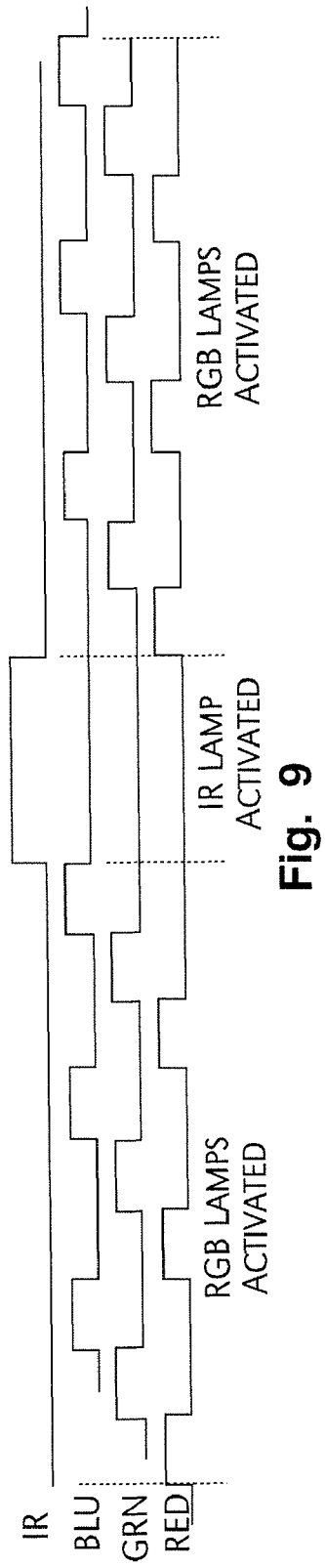
Fig. 8
(PRIOR ART)
Fig. 9

UNCURVED SUBSTRATE
(AS IN EXISTING ART)

LATERALLY CURVED
SUBSTRATE

LATERALLY AND AZIMUTHALLY
CURVED SUBSTRATE

AEROGEL BEYOND THE PIXEL PADS WILL SERVE AS A STANDOFF SURROUNDING EACH PIXEL.

RAPID ACTIVATION OF THE PIXEL SQUEEZES THE AEROGEL, CRUSHING IT INTO A LOW REFRACTIVE INDEX POWDER AND CREATING THE DESIRED AIRGAP.

ULTIMATE RESULT: AN AIRGAP WITH A SURROUNDING STANDOFF.

EXTENDING THE GAMUT COLOR GENERATION IN A DISPLAY

CROSS REFERENCE TO RELATED APPLICATIONS

The present application is a continuation application of U.S. Ser. No. 11/671,087 filed on Feb. 5, 2007 now U.S. Pat. No. 7,522,354, which is a continuation application of U.S. Ser. No. 11/430,576 filed on May 8, 2006 now U.S. Pat. No. 7,515,326, which is a continuation of U.S. Ser. No. 10/506,042 filed on Aug. 26, 2004, issued as U.S. Pat. No. 7,042,618 on May 9, 2006, which is a 371 National Phase of International Application No. PCT/US2003/005736 filed on Feb. 26, 2003, which claims priority under 35 U.S.C. §119(e) to the following U.S. Patent Applications: Ser. No. 60/359,783 filed on Feb. 26, 2002, Ser. No. 60/359,777 filed on Feb. 26, 2002, Ser. No. 60/359,755 filed on Feb. 26, 2002, Ser. No. 60/359,766 filed on Feb. 26, 2002, Ser. No. 60/359,601 filed on Feb. 26, 2002, and Ser. No. 60/359,600 filed on Feb. 26, 2002, all of which are hereby incorporated by reference herein.

This application is also related to U.S. Ser. No. 11/355,446 filed on Feb. 16, 2006, issued as U.S. Pat. No. 7,092,142 on Aug. 15, 2006, which is hereby incorporated by reference herein.

TECHNICAL FIELD

The present invention relates to the field of flat panel displays, and more particularly to implementing a registration-free, contiguous conductive plane that is itself flexible and capable of plate bending motion either alone or in tandem with an associated elastomeric layer.

BACKGROUND INFORMATION

A flat panel display may comprise a matrix of optical shutters commonly referred to as pixels or picture elements as illustrated in FIG. 1. FIG. 1 illustrates a flat panel display 100 comprised of a light guidance substrate 101 which may further comprise a flat panel matrix of pixels 102. It is noted that flat panel display 100 may comprise other elements than illustrated such as a light source, an opaque throat, an opaque backing layer, a reflector, and tubular lamps, as disclosed in U.S. Pat. No. 5,319,491, which is hereby incorporated herein by reference in its entirety.

Each pixel 102, as illustrated in FIGS. 2A and 2B, may comprise a light guidance substrate 201, a ground plane 202, a deformable elastomer layer 203, and a transparent electrode 204.

Pixel 102 may further comprise a transparent element shown for convenience of description as disk 205 (but not limited to a disk shape), disposed on the top surface of electrode 204, and formed of high-refractive index material, preferably the same material as comprises light guidance substrate 201.

In this particular embodiment, it is necessary that the distance between light guidance substrate 201 and disk 205 be controlled very accurately. In particular, it has been found that in the quiescent state, the distance between light guidance substrate 201 and disk 205 should be approximately 1.5 times the wavelength of the guided light, but in any event this distance must be maintained greater than one wavelength. Thus the relative thicknesses of ground plane 202, deformable elastomer layer 203, and electrode 204 are adjusted accordingly. In the active state, disk 205 must be pulled by capacitative action, as discussed below, to a distance of less than one wavelength from the top surface of light guidance substrate 201.

In operation, pixel 102 exploits an evanescent coupling effect, whereby TIR (Total Internal Reflection) is violated at pixel 102 by modifying the geometry of deformable elastomer layer 203 such that, under the capacitative attraction effect, a concavity 206 results (which can be seen in FIG. 2B). This resulting concavity 206 brings disk 205 within the limit of the light guidance substrate's evanescent field (generally extending outward from the light guidance substrate 201 up to one wavelength in distance). The electromagnetic wave nature of light causes the light to "jump" the intervening low-refractive-index cladding, i.e., deformable elastomer layer 203, across to the coupling disk 205 attached to the electrostatically-actuated dynamic concavity 206, thus defeating the guidance condition and TIR. Light ray 207 (shown in FIG. 2A) indicates the quiescent, light guiding state. Light ray 208 (shown in FIG. 2B) indicates the active state wherein light is coupled out of light guidance substrate 201.

The distance between electrode 204 and ground plane 202 may be extremely small, e.g., 1 micrometer, and occupied by deformable layer 203 such as a thin deposition of room temperature vulcanizing silicone. While the voltage is small, the electric field between the parallel plates of the capacitor (in effect, electrode 204 and ground plane 202 form a parallel plate capacitor) is high enough to impose a deforming force on the vulcanizing silicone thereby deforming elastomer layer 203 as illustrated in FIG. 2B. By compressing the vulcanizing silicone to an appropriate fraction, light that is guided within guided substrate 201 will strike the deformation at an angle of incidence greater than the critical angle for the refractive indices present and will couple light out of the substrate 201 through electrode 204 and disk 205.

The electric field between the parallel plates of the capacitor may be controlled by the charging and discharging of the capacitor which effectively causes the attraction between electrode 204 and ground plane 202. By charging the capacitor, the strength of the electrostatic forces between the plates increases thereby deforming elastomer layer 203 to couple light out of the substrate 201 through electrode 204 and disk 205 as illustrated in FIG. 2B. By discharging the capacitor, elastomer layer 203 returns to its original geometric shape thereby ceasing the coupling of light out of light guidance substrate 201 as illustrated in FIG. 2A.

However, the electrostatic actuators that involve parallel plate capacitor interaction, such as those disclosed in U.S. Pat. No. 5,319,491, often involve a large array of variable gap capacitors. Over large areas, registration (the term given to the optical alignment and geometric coincidence of complementary device components topologically disposed on either consecutive or nonconsecutive parallel planes in spaced-apart relation) between the discrete top and bottom capacitor plates becomes progressively more difficult to achieve, until the registration error is multiplied to the point that a large number of top and bottom plates no longer adequately register. That is, the top and bottom plates fail to coincide geometrically due to differential dimensional drift incurred during fabrication and/or assembly of the respective laminae on which the discrete elements are disposed. Therefore, there is a need in the art to implement a registration-free, contiguous conductive plane that is itself flexible and capable of plate bending motion either alone or in tandem with an associated elastomeric layer.

The images displayed on a display, such as the one disclosed in U.S. Pat. No. 5,319,491, do not correspond to physical reality for a number of reasons, apart from the two-dimensional flattening of three-dimensional real world entities. One of the reasons for a displayed image to not correspond to physical reality involves chrominance. Chrominance is the difference between a color and a chosen reference color of the same luminous intensity. The chrominance range, i.e., the range of difference between a color and a chosen reference color of the same luminous intensity, has been limited in order to keep display costs down. Consequently, the gamut of color reproduced on the display is limited. Typically, displays, such as the display disclosed in U.S. Pat. No. 5,319,491, use the three standard tristimulus colors, e.g., red, green and blue (RGB). That is, these displays modulate only three primary colors across a screen surface. By increasing the colors modulated across the screen surface, i.e., by extending the color gamut displayed, the image displayed will more closely correspond to physical reality. Therefore, there is a need in the art to extend the colors beyond the ability of RGB systems to reproduce without extensible modifications to such displays.

Furthermore, infrared and other non-visible light displays are generally not integrated into an existing full color RGB display. There is a need in the art for consolidating RGB and infrared (or other non-visible light(s)) in several disciplines, most notably avionics, where cockpit real estate is at a premium.

Furthermore, the display, such as the one disclosed in U.S. Pat. No. 5,319,491, incorporates FTIR (Frustrated Total Internal Reflection) means to emit light from the display surface. If an evanescent wave (such as that produced by total internal reflection), which extends approximately one wavelength beyond the surface of a separating medium of lower refractive index, should be invasively penetrated by a region occupied by a higher index of refraction material, energy may flow across the boundary. This phenomenon is known as evanescent coupling. Evanescent coupling is an effective means to achieve frustrated total internal reflection and bears affinity to quantum mechanical tunneling or barrier penetration.

Flat panel displays, such as the one disclosed in U.S. Pat. No. 5,319,491, that incorporate FTIR means are not curved. Consequently, the distance between the viewer's eyes and the display will vary across the screen. However, if the display were curved in such a manner that the distance between the observer's eyes and the screen's equator were equal anywhere along that equator, then the screen would be kept in focus for the observer. Therefore, there is a need in the art to create such a curved FTIR display screen.

Furthermore, there are various approaches to the problem of efficiently encoding information displayed on a field sequential color display. These algorithms generally presuppose unmodulated uniformity of the base color cycles that are manipulated at the pixel level as performed by U.S. Pat. No. 5,319,491.

FIG. 14 of U.S. Pat. No. 5,319,491 provides a graphic representation of the basic technique for generating color. FIG. 14 of U.S. Pat. No. 5,319,491 provides a timing diagram relating a shuttering sequence of the optical shutter to the 1/180 second strobed light pulses of red, green and blue. It may be appreciated that within any given 1/60 second color cycle various mixes of the three colors may be provided. Thus, as shown in FIG. 14 of U.S. Pat. No. 5,319,491, the first 1/60 second color cycle provides for a color mix 3/16 red, 8/16 blue, and 12/16 green. The mixtures obtainable depend only on the cycle rates of the optical shutter and the color strobing. However, using this method of U.S. Pat. No. 5,319,491 results in a limited palette size. Therefore, there is a need in the art to increase the available color palette.

Furthermore, there are various approaches to the problem of creating voids and complementary standoffs in Microscopic Electro Mechanical Systems (MEMS) structures. Preventing voids in MEMS devices from being filled with the next deposition layer is difficult. One method of attempting to prevent voids in MEMS devices from being filled with the next deposition layer is to deposit sacrificial layers of special material in the void. These sacrificial layers of special material are intended to occupy the void until removed by post-processing steps. Hence the term, "sacrificial," as applied to these special materials. Subsequent layers have the benefit of a flat, non-void surface upon which to be deposited. Hence, when the sacrificial layer is removed, the geometry of the final system is as intended. A void in this context is an empty volume disposed between solid laminae or their equivalents.

Creating standoff structures in the MEMS industry involves complicated multi-layer work, where all manners of multiple sub-steps and invocation of so-called "sacrificial" layers is required. Creating "valleys" below the level of "plateaus" is a key component in many micromechanical systems. Valleys provide mechanical degrees of freedom in which other elements, which might be ultimately anchored to the plateau, may undergo controlled motion. These "air gaps" are often the key to many MEMS-based devices, but their fabrication remains a complicated process.

MEMS may further require standoffs that are precision registered. In systems such as the Frustrated Total Internal Reflection Display System disclosed in U.S. Pat. No. 5,319, 491, this requirement becomes more acute in light of the larger area covered by highly detailed MEMS structures, which become increasingly susceptible to misregistration effects during fabrication. Therefore, a simpler fabrication mechanism is called for, preferably one in which sacrificial layers are essentially self-sacrificing without additional fabrication steps being required to generate the standoffs and interstitial air gaps between them.

SUMMARY

The problems outlined above may at least in part be solved in some embodiments of the present invention as addressed below.

The need in the art to implement a registration-free, contiguous conductive plate that is itself flexible and capable of plate bending motion may be addressed by the following embodiment of the present invention. In one embodiment, a circuit may comprise a plurality of conductive structures in a first plane. The circuit may further comprise a contiguous conductive equipotential surface in a second plane parallel to the first plane. The circuit may further comprise activation means configured to adjust an electric field between the first and second planes thereby activating one or more structures in the first plane by increasing a potential difference between the first and second planes to a threshold level deemed to constitute an active state. The circuit may further comprise deactivation means configured to adjust the electric field between the first and second planes thereby deactivating one or more structures in the first plane by decreasing the potential difference between the first and second planes below a threshold level deemed to constitute a deactivated state.

The need in the art to extend the colors beyond the ability of RGB systems to reproduce without extensible modifications to such displays may be addressed by the following embodiment of the present invention. In one embodiment, a flat panel display color generating mechanism may comprise a plurality of individual sources of color light selected to occupy vertices of a tristimulus color space triangle within a CIE color space. The flat panel display color generating mechanism may further comprise one or more individual sources of color light selected to lie outside the tristimulus color space triangle but within the visible portion of the CIE color space. The flat panel display color generating mechanism may further comprise an array of pixel structures configured to modulate light emitted by the plurality of individual sources of color light selected to occupy vertices of the tristimulus color space triangle within the CIE color space. The array of pixel structures is further configured to modulate light emitted by one or more individual sources of color light selected to lie outside the tristimulus color space triangle but within the visible portion of the CIE color space. A frequency and duration of pulses individually applied to the members of the array of pixel structures is selected in response to a number of color light sources outside the tristimulus color space triangle but within the CIE color space.

The need in the art to display both RGB images and non-visible images from a single display may be addressed by the following embodiment of the present invention. In one embodiment, a method for producing both non-visible and red, green, blue (RGB) images from a single display surface may comprise the step of activating RGB lamps configured to produce RGB images for a first period of time. The method may further comprise deactivating a non-visible lamp configured to produce non-visible images for the first period of time. The method may further comprise activating the non-visible lamp for a second period of time. The method may further comprise deactivating RGB lamps for the second period of time.

The need in the art to increase the available color palette may be addressed by the following embodiment of the present invention. In one embodiment, a method for extending a color palette may comprise the step of subdividing a primary color into n divisions resulting in n+1 intensities for the primary color. The method may further comprise adding m additional subdivisions to the primary color. The method may further comprise activating one or more of a plurality of lamps during a first m subdivisions of the primary color thereby resulting in the plurality of lamps operating at 1/(m+1) intensity during the first m subdivisions and adding one or more binary bits of information to the primary color to extend the color palette.

In another embodiment of the present invention, a method for extending a color palette may comprise the step of subdividing a primary color into n divisions resulting in n+1 intensities for the primary color. The method may further comprise adding m additional subdivisions to the primary color. The method may further comprise adjusting the intensity of a plurality of lamps during a first m subdivisions of the primary color resulting in the plurality of lamps operating at 1/(m+1) intensity during the first m subdivisions and adding one or more binary bits of information to the primary color to extend the color palette.

The need in the art to provide a simpler fabrication of MEMS, preferably one in which sacrificial layers are essentially self-sacrificing without additional fabrication steps being required to generate the standoffs and interstitial gaps between them may be addressed by the following embodiment of the present invention. In one embodiment, a pixel may comprise a substrate layer. The pixel may further comprise an electrode disposed on an upper surface of the substrate layer. The pixel may further comprise a self-sacrificing layer disposed on an upper surface of the electrode. The pixel may further comprise a deformable ground plane disposed on or in close proximity to an upper surface of the self-sacrificing layer. Upon applying a potential between the electrode and the deformable ground plane, the deformable ground plane may be configured to bend towards the electrode thereby crushing the self-sacrificing layer where the crushing of the self-sacrificing layer creates one or more voids.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 8 is a timing diagram depicting the signal pulse widths for four pixels and the colors blue, green and red in a display system such as the display system in U.S. Pat. No. 5,319,491;

FIG. 9 is an embodiment of the present invention of a timing diagram depicting the signal pulse widths for four pixels and the colors blue, green and red as well as infrared output in a display system incorporating the principles of the present invention;

DETAILED DESCRIPTION

The present invention comprises a circuit to implement a registration-free, contiguous conductive plate that is itself flexible and capable of plate bending motion. In one embodiment of the present invention, a circuit may comprise a plurality of conductive structures in a first plane. The circuit may further comprise a contiguous conductive equipotential surface in a second plane parallel to the first plane. The circuit may further comprise activation means configured to adjust an electric field between the first and second planes thereby activating one or more structures in the first plane by increasing a potential difference between the first and second planes to a threshold level deemed to constitute an active state. The circuit may further comprise deactivation means configured to adjust the electric field between the first and second planes thereby deactivating one or more structures in the first plane by decreasing the potential difference between the first and second planes below a threshold level deemed to constitute a deactivated state.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Common Ground Discharge Circuit

As stated in the Background Information section, the electrostatic actuators that involve parallel plate capacitor interaction, such as those disclosed in U.S. Pat. No. 5,319,491, often involve a large array of variable gap capacitors. Over large areas, registration between the discrete top and bottom capacitor plates becomes progressively more difficult, until registration error is multiplied to the point that a large number of top and bottom plates no longer adequately register. That is, the top and bottom plates fail to coincide geometrically due to differential dimensional drift incurred during fabrication and/or assembly of the respective laminae on which the discrete elements are disposed. Therefore, there is a need in the art to implement a registration-free, contiguous conductive plane that is, or may optionally be, itself flexible and capable of plate bending motion either alone or in tandem with an associated elastomeric layer.

Figure 1:
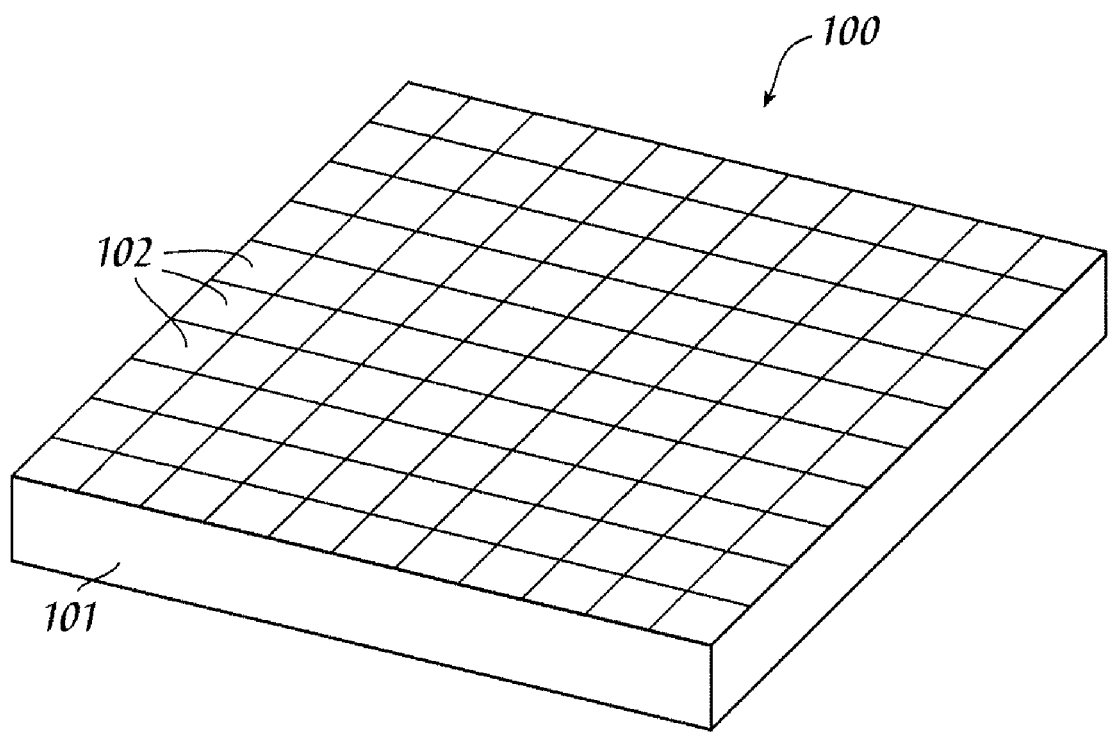
FIG. 1 illustrates a perspective view of a flat panel display.
Figure 3:
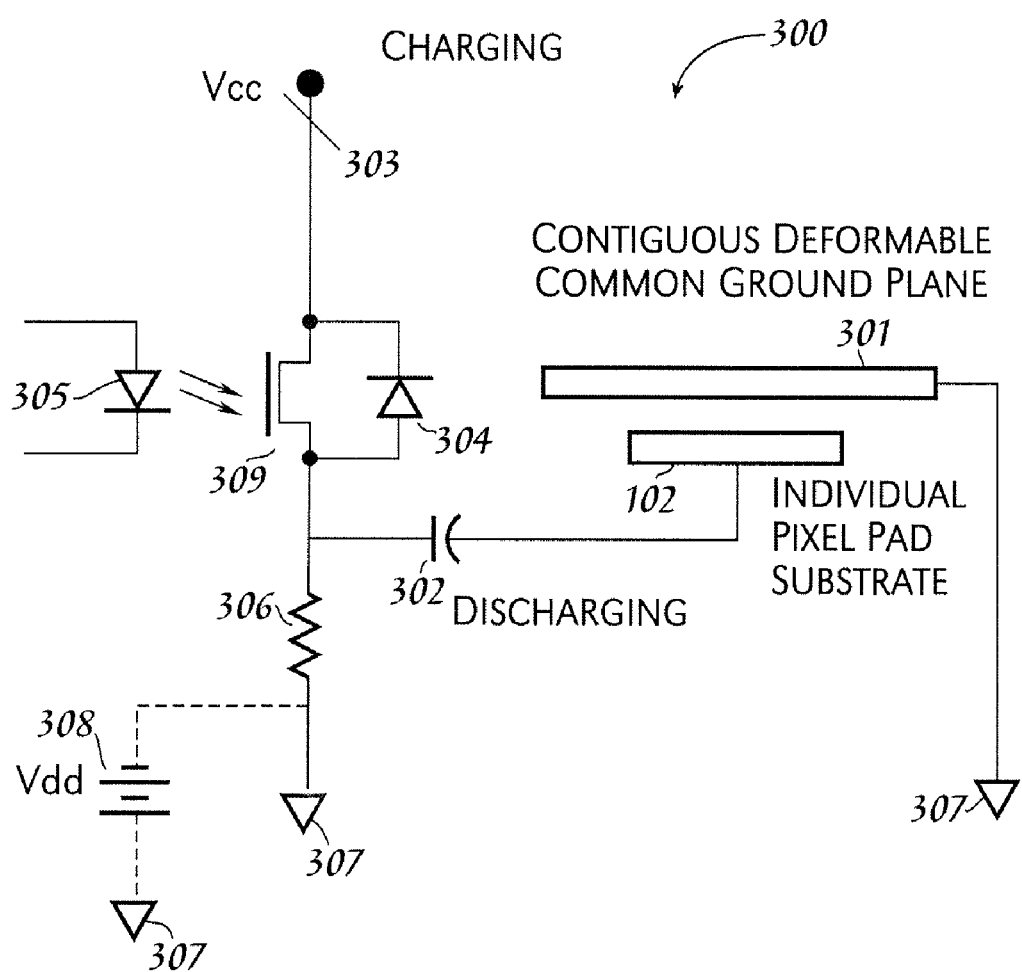
FIG. 3 illustrates an embodiment of the present invention of a circuit topology to implement a registration-free, contiguous conductive plane.

FIG. 3 illustrates an embodiment of the present invention of a circuit topology 300 to implement a registration-free, contiguous conductive plane 301 that is itself flexible and capable of plate bending motion. Circuit topology 300 further comprises pixel pad 102 on substrate 101 (FIG. 1). Pixel pad 102 may be coupled to an optional stabilizing capacitor 302 configured to prevent catastrophic collapse during actuation. As illustrated in FIG. 3, ground plane 301 may be spaced apart from pixel pad 102. Circuit topology 300 further comprises circuitry configured to control charging and discharging of the quasi-capacitive structure formed by the conjunction of pixel pad 102 and ground plane 301. This circuitry comprises a power source Vcc 303 coupled to diode 304 coupled to resistor 306 coupled to ground 307. The circuitry further comprises a light emitting diode 305 configured to optically turn on/off switch 308 coupled to diode 304. In another embodiment, ground 307 may be coupled to power source Vdd 308 which may be coupled to resistor 306. It is noted that although only one individual pixel is depicted, it would be understood to one of ordinary skill in the art that a multiplicity of pixels may be disposed in a spaced apart relation to the common ground plane, such that the gaps have equal initial distance values. It is further noted that a pixel is here treated as a quasi-capacitive system comprised of two conductive regions, such as pixel pad 102 and ground plane 301, separated by a simple or complex interstitial dielectric region. In a display screen, these pixels could easily number upwards of one or two million, and sometimes even more. It is further noted that the precise switching mechanism chosen (exemplified, for example, by components 303, 304, 305, and 306) is representative of a wider range of devices, and that the present invention is not limited to the specific choice of exemplar set forth herein to charge and discharge the quasi-capacitive system formed by pixel pad 102 and conductive ground plane 301.

Figure 4:
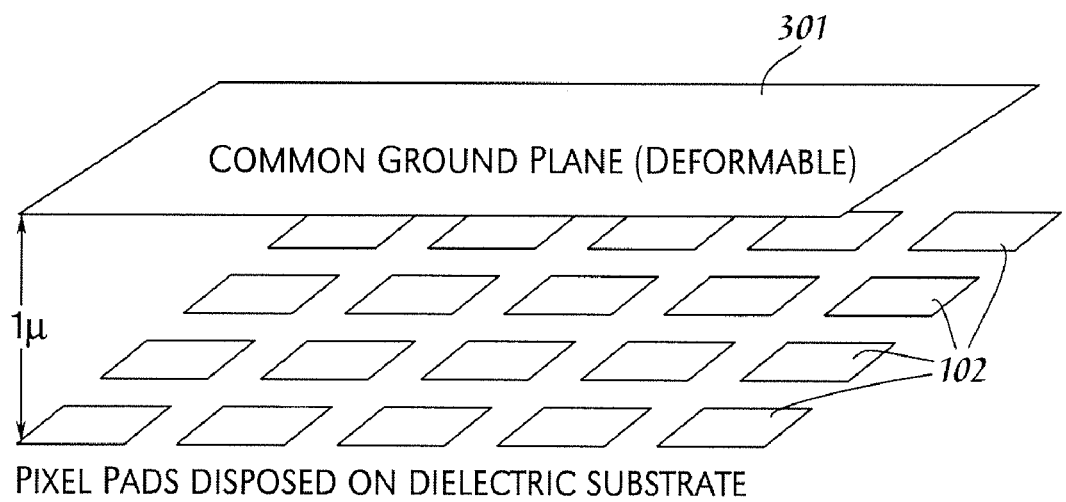
FIG. 4 illustrates an embodiment of the present invention of a side view of the separation between the deformable ground plane and the pixel pads disposed on a substrate.

An idealization for the sake of ease of illustration is provided in FIG. 4, where sixteen pixels 102 in a 4×4 matrix are disposed in a spaced-apart relation to common conductive ground plane 301. The pixel pads 102 interact, in this illustration, electromechanically with ground plane 301. It is noted that the mode of interactions available for exploitation are not to be conceived as limited to electromechanical actuation or induced ponderomotive forces. Traditionally, such parallel plate capacitor systems as used in this illustration are composed of pairs of conductive pads (in the 4×4 example, there would then be sixteen lower pads and sixteen upper pads, all of identical size). In the present invention, the multiplicity of upper pads may be replaced with a single contiguous conductive plane 301, thus obviating the need for careful registration (positioning) of upper pads over lower pads. Further, by replacing the multiplicity of the upper pads with a single contiguous conductive plane 301, the need for a complicated trace system to provide electrical signal flow to each of the upper pads may now be obviated. The trace system (determinative of the geometry of discrete conductive elements and their charge lines) may be limited to the lower pads, which may be topologically unaffected by implementation of this present invention. Alternatively, the single plane 301 could be replaced with any number of ground planes of a number less than the number of pixel pads 102 and still be within the scope of the present invention. It is noted that ground plane 301 and the plane upon which pixel pads 102 are disposed may be disposed on either Euclidean or non-Euclidean surfaces.

Referring to FIG. 3, the present invention provides the necessary circuit topology to both charge the quasi-capacitive structure formed by the conjunction of pixel pad 102 and common ground plane 301, electromotively increasing the potential difference between them (thus developing an attractive force between pixel pad 102 and common ground plane 301 in response to the interstitial electrical field developed during activation, which leads to a distortion in common ground plane 301 in the vicinity centered over the charged pixel pad 102) and to discharge that same quasi-capacitive structure by equalizing the potential difference between pixel pad 102 and common ground plane 301 (reducing the electrostatic attraction to zero, causing the common ground plane 301, which was elastomerically distorted during the charging cycle, to return to its original geometry). This approach lends itself well to driving the evanescent embodiment (among others) disclosed in U.S. Pat. No. 5,319,491, (vide FIGS. 16 and 17 therein), but it should be borne in mind that the present invention may be generalized to systems that do not specifically call for mechanical motion or distortion in their several parts. Accordingly, the driver components of FIG. 3 of the present invention (exemplified, for example, by components 303, 304, 305, and 306) that modulate the applied electrical signal are representative of an entire class of electrical drivers, which can be geared to many specific devices, e.g., liquid crystal display devices. The one micron distance between the pads and plane in FIG. 4 is representative of several mechanical devices, but the present invention covers systems where this specific spacing factor is neither critical nor normative, such as in liquid crystal display systems.

From an electrical standpoint, the present invention substitutes a conductive equipotential surface for the target layer including a plurality of electrically-active components (referred to as the "upper" elements). Further, the present invention treats charging and discharging of the remaining "lower" elements (with respect to the conductive equipotential surface) whose complements were concatenated into the equipotential surface as a process of switching the system between equilibrium and non-equilibrium states as measured between the upper equipotential surface and one or more members of the lower plurality of discrete elements disposed in spaced-apart relation to the equipotential surface. The terms "upper" and "lower" should be regarded as relative terms useful as heuristic guides, inasmuch as the devices contemplated generally do not have preferential spatial orientations.

One or more elements or pixels 102 in a conductive plane may be activated when an electric field between ground plane 301 and the conductive plane is at and/or exceeds a threshold level determined to constitute an "active state". One or more elements or pixels 102 in the conductive plane may be deactivated when an electric field between ground plane 301 and the conductive plane is at and/or below a threshold level determined to constitute a "deactive state". The activation of one or more pixels 102 may result in the deformation of ground plane 301, as discussed above, as well as ponderomotive action. The deactivation of one or more pixels 102 may result in a reversal of the deformation of ground plane 301 due to the elastomeric properties of ground plane 301. It is noted that the activated pixels may function in a first state, e.g., on-state, in a binary switch and that the deactivated pixels may function in a second state, e.g., off-state, in a binary switch.

The deformation of ground plane 301 may induce frustrating the total internal reflection (TIR) of light in the dielectric substrate upon which pixel pads 102 are disposed. Frustrating the TIR of light through evanescent coupling may be caused by propelling a high refractive index material in intimate contact with the deformed ground plane 301 into an evanescent field of the dielectric substrate. The evanescent field may extend upwards of 1 micrometer above the surface of the dielectric substrate. The reversal of the deformation of ground plane 301 may induce termination of the frustration of the TIR of light.

Referring to FIG. 4, an interstitial dielectric (not shown) may be placed between ground plane 301 and the dielectric substrate upon which pixel pads 102 are disposed. The activation of one or more pixels 102 may result in changes to the interstitial dielectric (not shown), e.g., optical, electro-optical, refractive index, optomechanical, optically non-linear effects, The deactivation of one or more pixels 102 may result in a reversal of the changes to the interstitial dielectric (not shown).

Extending Color Gamut

As stated in the Background Information section, the images displayed on a display, such as the one disclosed in U.S. Pat. No. 5,319,491, do not correspond to physical reality for a number of reasons, apart from the two-dimensional flattening of three-dimensional real world entities. One of the reasons for a displayed image to not correspond to physical reality involves chrominance. Chrominance is the difference between a color and a chosen reference color of the same luminous intensity. The chrominance range, i.e., the range of difference between a color and a chosen reference color of the same luminous intensity, has been limited in order to keep display costs down. Consequently, the gamut of color reproduced on the display is limited. Typically, displays, such as the display disclosed in U.S. Pat. No. 5,319,491, uses the three standard tristimulus colors, e.g., red, green and blue (RGB). That is, these displays modulate only three primary colors across a screen surface. By increasing the colors modulated across the screen surface, i.e., by extending the color gamut displayed, the image displayed will more closely correspond to physical reality. Therefore, there is a need in the art to extend the colors beyond the ability of RGB systems to reproduce without extensible modifications to such displays.

Figure 5:
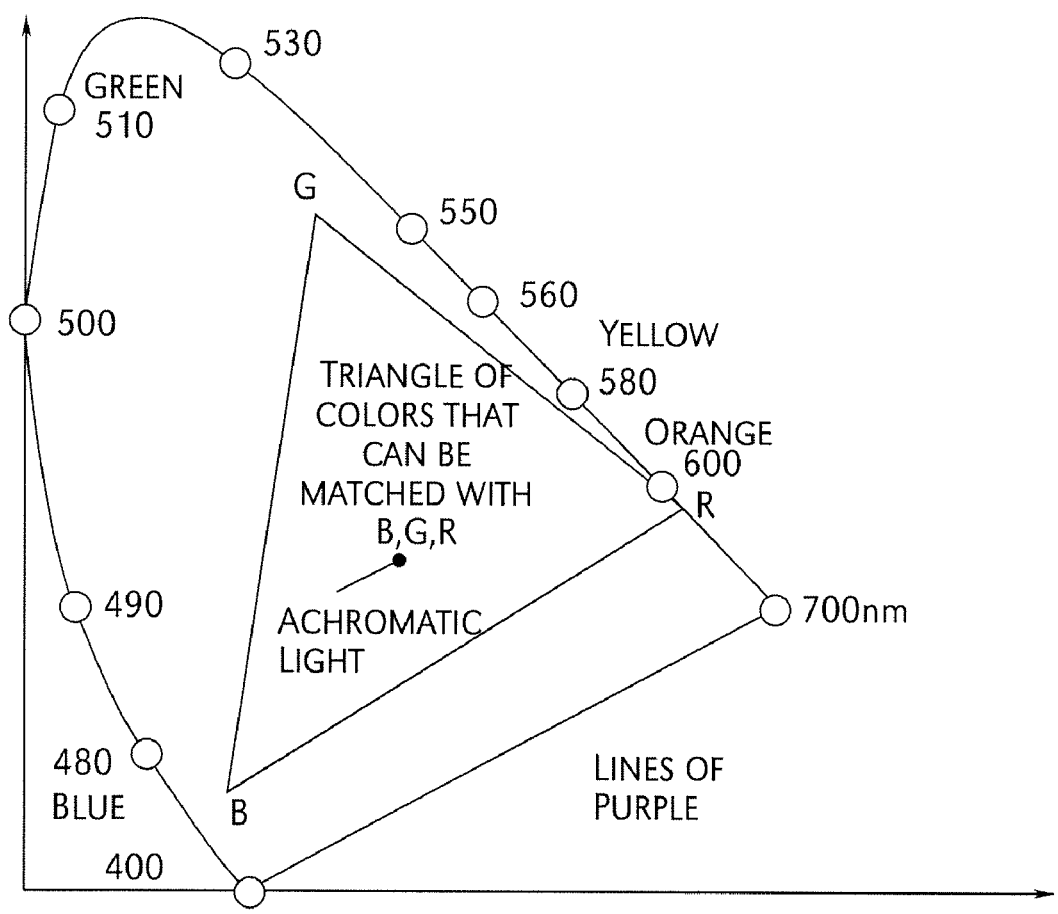
FIG. 5 illustrates a CIE color space depicting both the gamut of normal human vision and the gamut of colors displayed by an RGB monitor.

FIG. 5 illustrates a CIE color space depicting both the gamut of normal human vision covering the entire CIE diagram and the gamut of colors displayed by an RGB monitor within a triangle commonly referred to as the "tristimulus triangle". The primary sources of light in an RGB monitor, i.e., red, green and blue, occupy vertices of the tristimulus triangle as illustrated in FIG. 5. The colors which can be matched by combining a given set of these three primary colors, i.e., red, green and blue, are represented on the chromaticity diagram by the tristimulus triangle joining the coordinates for the three colors. However, the gamut of normal human vision covers colors generated outside the tristimulus triangle. The present invention provides a technique for displaying colors outside the tristimulus triangle as discussed below.

Figure 6:
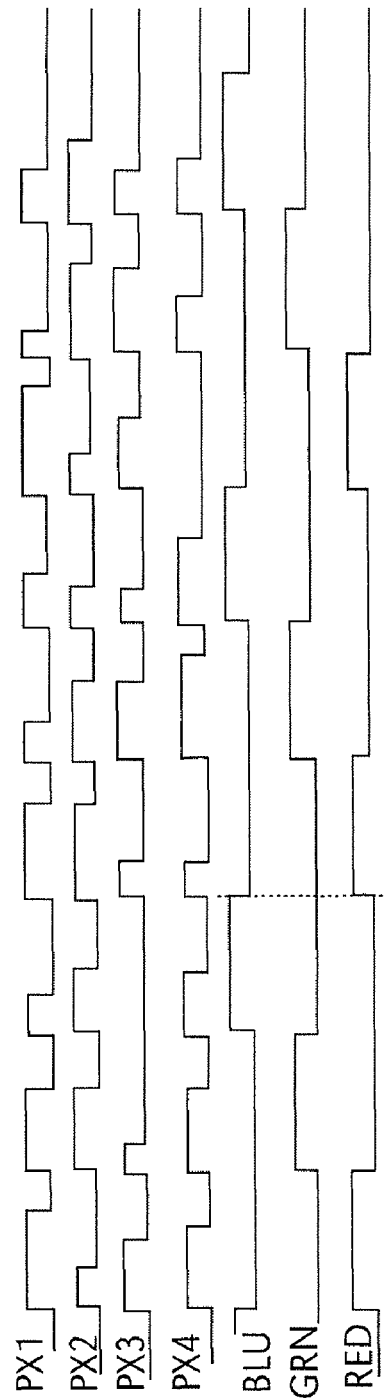
FIG. 6 is a timing diagram depicting the signal pulse widths for four pixels and the colors blue, green and red used in a display system such as the display system in U.S. Pat. No. 5,319,491.

FIG. 6 illustrates a timing diagram depicting the signal pulse widths for four pixels and the colors blue, green and red used in a display system, such as the display system in U.S. Pat. No. 5,319,491.

Figure 7:
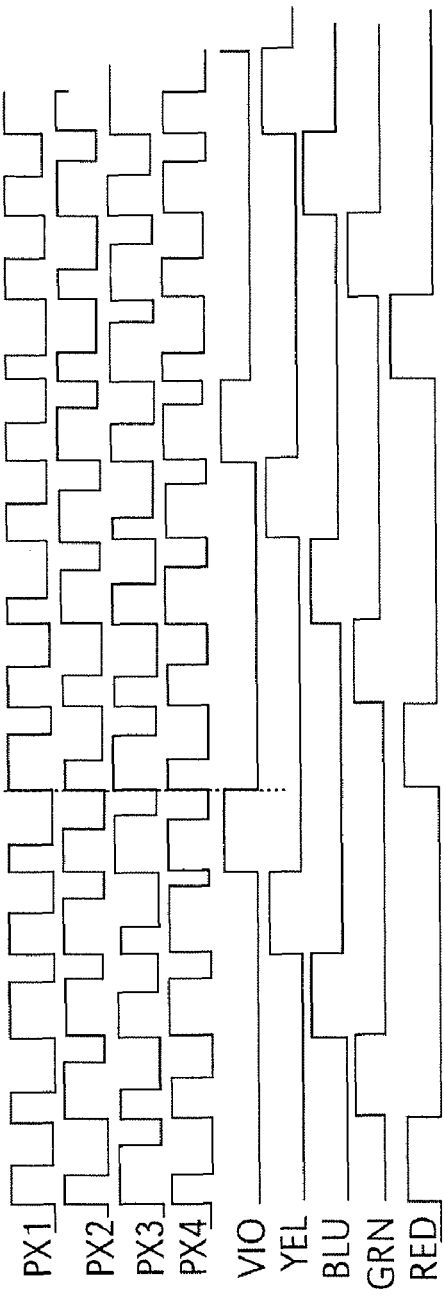
FIG. 7 is an embodiment of the present invention of a timing diagram depicting the signal pulse widths for four pixels and the colors blue, green and red used in a display system incorporating the principles of the present invention.

FIG. 7 illustrates a timing diagram depicting the signal pulse widths for four pixels and the colors blue, green, red, yellow and violet used in a display system, such as a display system similar to the one described in U.S. Pat. No. 5,319,491, incorporating the principles of the present invention as discussed below.

A technique for extending the gamut of colors produced in an RGB system may comprise the step of smoothing video without color breakup by ensuring that the cycling frequency is sufficiently high. When additional primary colors lying outside the tristimulus color space triangle but within the CIE color space are added to the display, this fundamental requirement may not be relaxed. As illustrated in FIG. 7, two additional primaries lying outside the tristimulus color space triangle but within the CIE color space may be added to the RGB system in order to extend the colors reproduced by the RGB system. It is noted that any number of additional primary colors, e.g., one additional primary color, lying outside the tristimulus color space triangle but within the CIE color space may be added to the RGB system and that FIG. 7 is illustrative. These pixel structures, e.g., PX1-4 in FIG. 7, are configured to modulate light emitted by both the light sources in the tristimulus color space triangle and one or more light sources lying outside the tristimulus color space triangle but within the CIE color space as illustrated in FIG. 7. The five primary colors, as illustrated in FIG. 7, may have to still fire at the same time that the three primary colors had formerly fired, as illustrated in FIG. 6. The resulting compression is made clear by comparing the source signal pulse widths between FIGS. 6 and 7. The pixels may also have to be turned on and off more frequently, e.g., at a frequency 67% higher than simple RGB color entailed. That is, the frequency and duration of the pulses of the array of pixel structures, e.g., PX1-4 in FIG. 7, may be temporally proportioned to and synchronized with the number of color light sources outside the tristimulus color space triangle but within the CIE color space, e.g., 2 additional primary colors in FIG. 7.

Selection of additional primaries beyond the tristimulus primaries is directly related both to desired color space expansion and imaging acquisition/encoding systems. The present invention may be transparent to these prefatory factors since it exists solely to provide a transducer capable of reproducing the encoded signal (referring to encoding both the tristimulus colors and the colors lying outside the tristimulus color space triangle) on a high pixel density screen display.

The color space/color gamut may be enlarged merely by selection of a single additional primary, but the requisite encoding and image capture equipment may have to be matched to that chosen distal end of the CIE color space being stretched beyond the RGB color range. Thus, a quadstimulus color space, as well as a pentastimulus color space, may be supported by the present invention by appropriate modification of the primary cycles and pixel encodings. Moreover, the present invention may also handle color spaces built on more than five colors if this is desired. Note that there is no explicit requirement that the pulse widths for each color (in FIG. 7's example, red, green, blue, yellow, and violet) be of identical duration. It is noted that the pulse widths for each color in FIG. 7 are shown to be equal in length for ease of understanding. It is not clear whether or not additional primaries beyond the tristimulus trio of primaries require intensity modulation as tightly controlled as the tristimulus colors need. It is noteworthy that among the tristimulus colors themselves, the human eye shows less sensitivity to gray scale values in blue than in either red or green. If this fact is true among the base primaries, it may be possible that the analogy will hold for some or all of the members of the added coordinates in the CIE color space provided by the new extended gamut primaries. In the case of subtractive primaries that have undergone gamut enhancement, the additional fluorescent inks are used sparingly, not heavily. This may be true for colors that spread the display's available color gamut as well. Those points in the CIE color space now rendered available by addition and manipulation of the additional primary color light sources might require relatively fewer gray scales to be effective in providing a smooth, fully-accessible gamut of visible color reproduction.

Adding a desired non-tristimulus vertex to construct an extended-gamut polygon in the CIE color space may be achieved either by adding one or more light sources that emit the target color defined at that vertex point, or by generating that color by composition of dissimilar surrogate light sources that chromatically sum up to that vertex location based on their weighted intensities. This last strategy may prove useful given the wide variation in power efficiency that prevails among monochromatic light sources currently being manufactured, since a desired primary color that takes considerable power to produce as a single light source might be achieved with considerably less power if distributed between two other colors selected such that the desired target primary lies along the line between these two surrogate light sources in the CIE color space.

Visible Plus Non-Visible Field Sequential Color

As stated in the Background Information section, infrared and other non-visible light displays are generally not integrated into an existing full color RGB display. There is a need in the art for consolidating RGB and infrared (or other non-visible light(s)) in several disciplines, most notably avionics, where cockpit real estate is at a premium.

FIG. 8 illustrates a standard RGB system configured according to the technical contours disclosed in U.S. Pat. No. 5,319,491 (vide FIG. 14 in loc. cit), in which four pixels modulate the source lamp intensities using pulse width modulation. It is noted that the technique described below to consolidate RGB and infrared (or other non-visible light) into a single display may use amplitude modulation as well as pulse width modulation. It is further noted that a person of ordinary skill in the art would be capable of applying amplitude modulation using the principles of the present invention to consolidate RGB and infrared (or other non-visible light) into a single display. It is further noted that embodiments applying amplitude modulation using the principles of the present invention to consolidate RGB and infrared (or other non-visible light) into a single display would fall within the scope of the present invention.

In order to produce both RGB color output and gray scale infrared output, the device may be reconfigured as illustrated in FIG. 9. When infrared output is desired, as illustrated in the middle bracketed region of FIG. 9, the RGB primary lamps are shut down and the infrared lamp is activated. This may be referred to as the "infrared mode". When the RGB primary lamps are activated and the infrared lamp is shut down, this may be referred to as the "RGB mode". To reactivate the RGB mode, the infrared lamp is deactivated and the successive R-G-B cycle common to field sequential visible color is reenabled, as illustrated in the right-most bracketed region of FIG. 9. Note that in principle, there is nothing to prevent simultaneous display of visible and infrared images on the display using field sequential color means, and the information encoded for these two simultaneously displayed images may be distinct from one another. The lamp firing sequence would be a hybridized sequence such as R-G-B-Infrared in repeated succession, with appropriate synchronized pixel level modulations applied at the appropriate points in this four-part cycle to form the composite image to be displayed. This approach may be extensible to systems that do not have three discrete primary lamps for red, green, and blue, but rather filter white light through color wells or filters in either field sequential or amplitude modulated modes. Pixels operating during the infrared cycle may either retain their existing RGB encoding, producing a composite grayscale image in infrared, or a separately optimized infrared signal may be substituted for the RGB encoding, as required.

If ultraviolet is substituted for infrared, the screen becomes capable of ultraviolet output, although such output is not likely to be suited to visual display applications. Microlithography masks may be configured using such a system, which may be dynamically programmed and configured. The retention of the RGB profile allows safe inspection of the mask structure (determined by the pattern of opened pixels) by visual means, to confirm that the topology of the programmed mask encoded in the pixel matrix matches the actual device. This last concept renders the device both a dynamically programmable photomask that can be continually re-used, as well as a display device, suited for verifying and examining photo mask circuit topologies without viewing a dangerous ultraviolet output to do so. This represents a considerable technological breakthrough in the field of printed circuit board and large-scale microelectronic systems fabrication, limited only by the pixel resolution of the screen. Displays/dynamic photo mask combinations as contemplated under this disclosure ought minimally to be able to achieve a pixel density of upwards of 1000 pixels per inch.

Curved FTIR Display Screen

As stated in the Background Information section, flat panel displays, such as the one disclosed in U.S. Pat. No. 5,319,491, that incorporate FTIR means are not curved. Consequently, the distance between the viewer's eyes and the display will vary across the screen. However, if the display were curved in such a manner that the distance between the observer's eyes and the screen's equator were equal anywhere along that equator, then the screen would be kept in focus for the observer. Therefore, there is a need in the art to create such a curved FTIR display screen.

Display Devices, such as the one disclosed in U.S. Pat. No. 5,319,491, involve the injection of light into a substrate that has a higher refractive index than its immediate surroundings (whether air or a cladding of lower refractive index, such as a silica aerogel). Snell's Law determines the critical angle at which light entering the substrate will reflect back into the substrate rather than propagate back out at the point of incidence on the primary planar surfaces. Although the edges of the substrate could likewise constrain light propagation in this manner—involving constraining the angle of light injection along a dimension orthogonal to the constraining angle determined for the primary planar surfaces—it may be customary to coat the edges with highly reflective material to create a mirrored inner surface that permits greater freedom of light injection angles in the plane parallel to the primary surface. In existing art, the substrates are almost invariably parallelopiped structures with rigidly rectilinear proportions.

Figure 10:
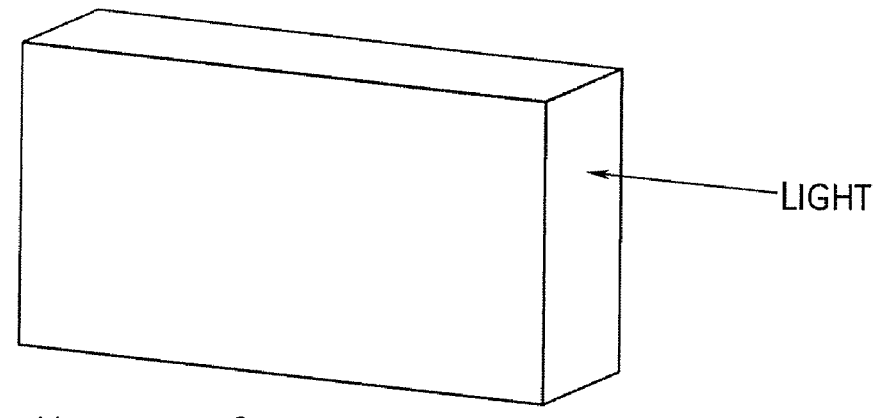
FIG. 10 illustrates embodiments of the present invention of a display system incorporating FTIR means with a single axis of curvature and double axial curvatures.
Figure 10:
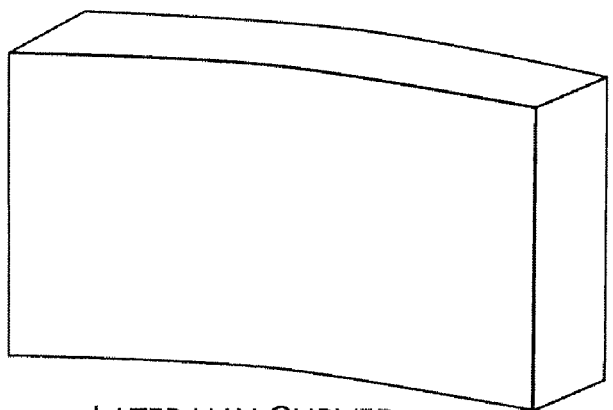
Figure 10:
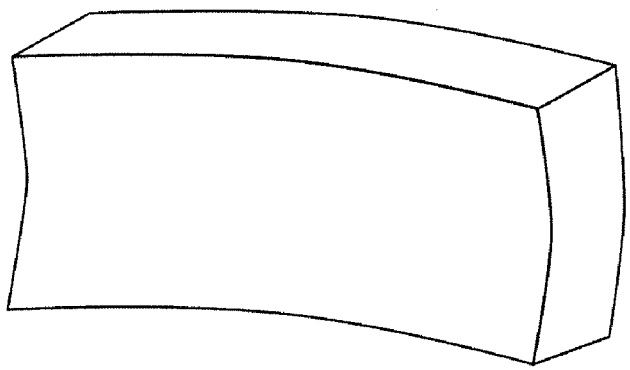

FIG. 10 demonstrates the difference between prior art (inclusive of U.S. Pat. No. 5,319,491, which is a suitable archetype and representative of this class of display devices for the purposes of this disclosure) and an embodiment of the present invention, which provides for single and double axis curvatures of the underlying FTIR substrate.

It should be appreciated that the general rules governing the bending of fiber optic cables also apply to the present invention. Both fiber optic cables and the present invention exploit the relationships set forth by Snell's Law to preserve the guidance condition whereby light that initially propagates by total internal reflection within the interior of the guidance substrate continues to do so, notwithstanding the imposed curvatures, so long as it is not deliberately coupled out of the substrate, as would occur at the site of an active pixel disposed at or near the substrate surface. Where great curvature along a given axis is required, optical analysis may possibly dictate additional restriction of injection angles due to a correlated shift in the value of the critical angle for total internal reflection to obtain. Excessive curvature may create a large increase in the noise floor of the display device, rendering it effectively unusable.

FIG. 10 illustrates embodiments of the present invention. In one embodiment, the present invention may exhibit a single axis of curvature (here arbitrarily shown as lateral). In another embodiment, the present invention may exhibit double axial curvatures. Note that introducing a curvature along the third remaining axis would not only distort the rectangular shape of the screen, but more importantly would alter the rectilinear relationships of the planes intersected by the four edges such that orthogonality would no longer apply. Deviation from orthogonality is not favorably conducive to predictable FTIR operation in most cases, but exceptions exist. Nonetheless, the more important axes of curvature exploited in the instant invention are disclosed in FIG. 10.

All FTIR displays that exhibit deviation from Euclidean parallelopiped structures such that either lateral and/or azimuthal curvature radii are in evidence are claimed for the present invention. The present invention covers all relevant applications of such curved FTIR screens, inclusive of display integration with windshield structures for aircraft and automobiles, and whether the displays emit only white light, colored light (achieved by field sequential color techniques or not), light beyond the conventional range defined by the tristimulus colors (red, green, and blue), or nonvisible light (such as infrared or ultraviolet, alone or in any combination with visible lights). For a display exhibiting both azimuthal and lateral curvature, the principles of the present invention may be applied to displays for which the respective curvature radii are equal, as well as unequal. The principles of the present invention may also be applied to non-Euclidean geometries beyond simple curves (parabolic or higher-order curvatures, negative curvatures). It is noted that not all of surfaces orthogonal to the light emitting surface need to constitute actual edges of the dielectric light guide. It is further noted that those surfaces orthogonal to the light emitting surface intended for reflection rather than light insertion can be structured as virtual planar mirrors created by reflective planes, fabricated by techniques such as reactive ion beam etching, that are situated at determinate points interior to the substrate and constructed so as to satisfy the orthogonality requirement.

Field Sequential Color Palette Enhancement

Figure 14:
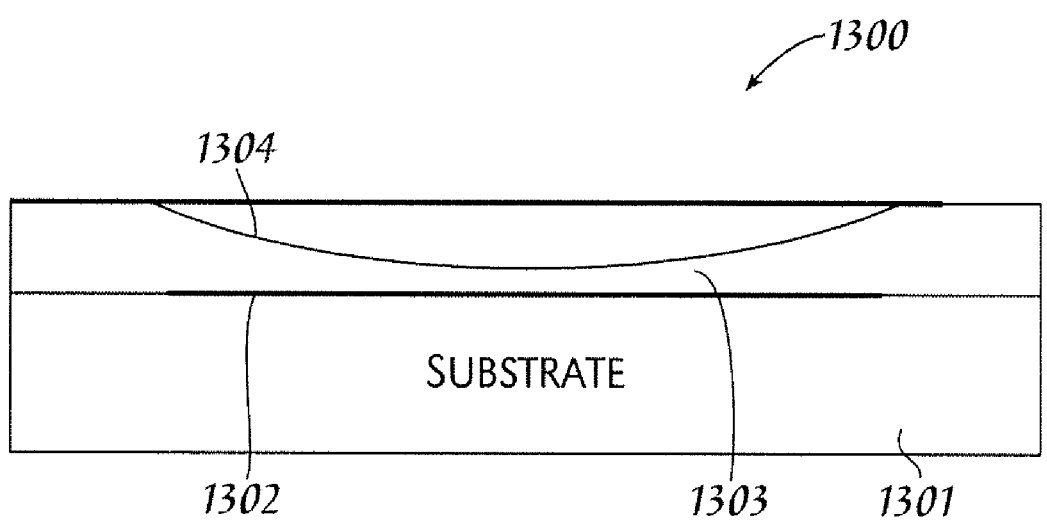
FIG. 14 illustrates an embodiment of the present invention of crushing an aerogel layer upon applying a potential between an electrode and a ground plane.

As stated in the Background Information section, FIG. 14 of U.S. Pat. No. 5,319,491 provides a graphic representation of the basic technique for generating color. FIG. 14 of U.S. Pat. No. 5,319,491 provides a timing diagram relating a shuttering sequence of the optical shutter to the 1/180 second strobed light pulses of red, green and blue. It may be appreciated that within any given 1/60 second color cycle various mixes of the three colors may be provided. It is noted that the present invention may function at frequencies both higher and lower than the representative values just stated. Thus, as shown in FIG. 14 of U.S. Pat. No. 5,319,491, the first 1/60 second color cycle provides for a color mix 3/16 red, 8/16 blue, and 12/16 green. The mixtures obtainable depend only on the cycle rates of the optical shutter and the color strobing. However, using this method of U.S. Pat. No. 5,319,491 results in a limited palette size. Therefore, there is a need in the art to increase the available color palette as addressed by the present invention discussed below.

The palette size may be increased by using fractional drive lamp intensities (whether by amplitude or number of lamps activated) for specified portions of a subframe cycle. For example, during the first subdivision of a primary cycle, the lamps may be set at 1/2 intensity. This may allow addressing of the subdivision to generate half-integral pixel brightness values, otherwise accessible only by doubling the amount of subdivisions and thus increasing computational bandwidth requirements in the process. If the first three subdivisions have the lamp intensities set at 1/4 of full intensity, this may quadruple the palette without quadrupling the number of subdivisions. Placing the attenuated drive lamp subdivisions at the leading edge of the cycle may be required to avoid having more than one on-off signal per pixel per cycle while still exploiting common drive lamps for the entire pixel array. It is noted that the miniscule waste of energy that arises when the fractional subdivisions may not be used may be abridged by using two rather than one 1/2 intensity cycles or four rather than three 1/4 intensity cycles. Hence, there is a tradeoff between a tiny energy savings and a slight increase in required bandwidth. The system should track program content to determine whether half or quarter integral palette values are needed, dynamically implementing them on an as-needed basis to conserve energy.

Field Sequential Color Displays using pulse width modulation techniques (such as the one disclosed in U.S. Pat. No. 5,319,491) create gray scale values by dividing a primary color cycle into fractional slices. The total color palette increases as the number of subdivisions increases. A well-known example is the 24-bit standard where each of the primary colors (red, green, blue) are divided into 256 subdivisions (2 to the eighth power). The total number of available colors would equal 256×256×256=16,771,216 colors. However, the data throughput required to access a display screen's pixels 256 times during a primary subcycle (itself typically under 5 milliseconds in duration to ensure flicker-free performance and color-breakup artifacts noted in the literature) may be impractically high. In the former example, a screen with one million pixels would have to address all million of them once every 21 microseconds, translating to a data throughput requirement exceeding 46 gigabytes per second, with 46 GHz processing power to drive the encoding process. Pulse width modulation approaches therefore reduce the palette size to manageable proportions, seeking a compromise that provides an ergonomically useful palette without placing undue demands on the driver circuitry. Dividing each primary subcycle into 16 divisions permits display of a color palette of 4096 colors. The palette size increases as the cube of the number of divisions.

The present invention may offer a powerful solution to the palette size problem that yields significantly larger palette sizes without a commensurate and impractical rise in real time computing power in the display's driver circuitry. The chief component of this enhancement strategy involves adjusting the intensity of the drive lamps for certain determinate divisions of each primary subcycle. There are two variations of the present invention, one tailored to contiguous pulse signal displays and one tailored to displays capable of noncontiguous pulse signal processing.

Figure 11:
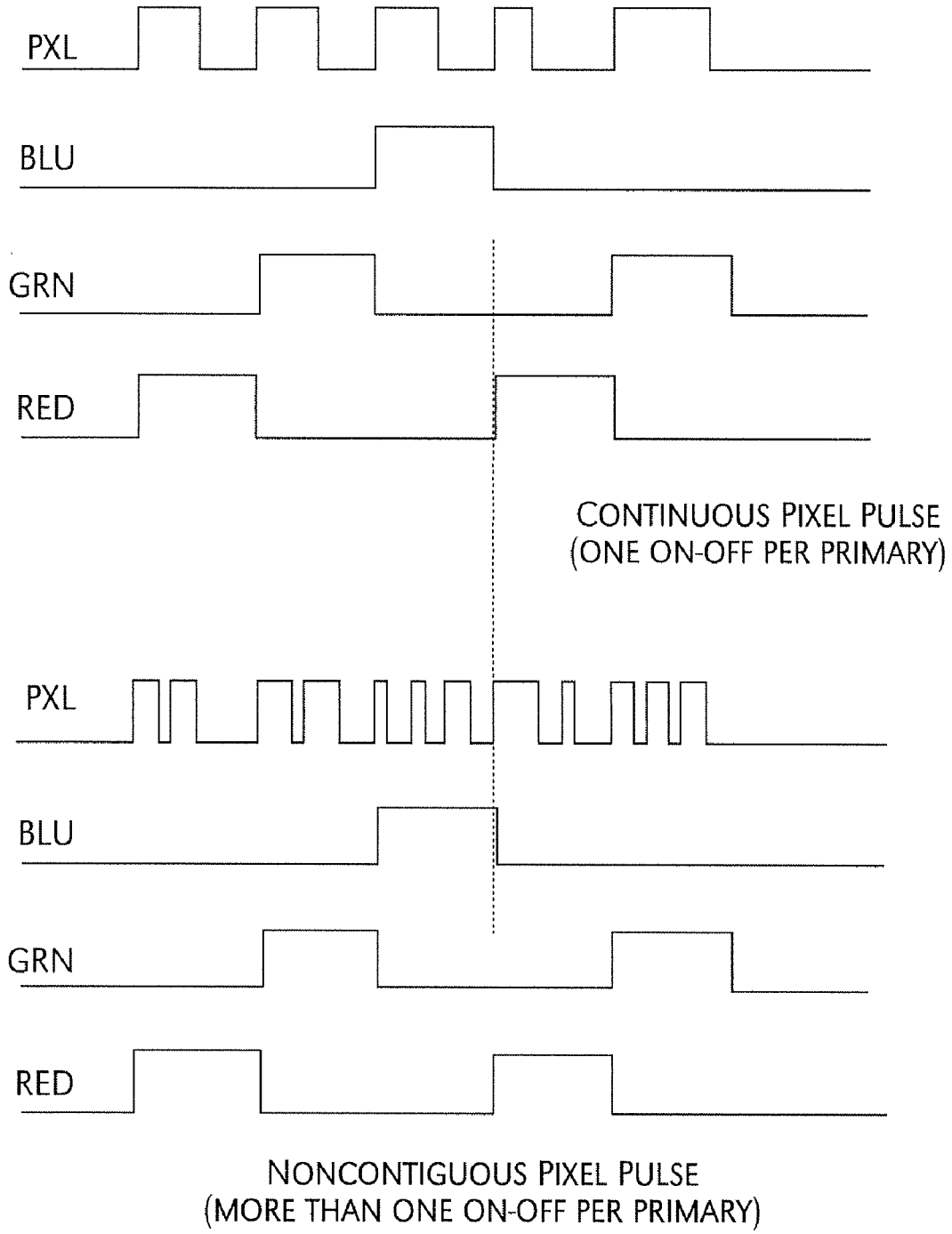
FIG. 11 is a timing diagram depicting the differences between contiguous pulses and noncontiguous pulses.

A contiguous pulse signal display is distinctive in that for each primary subcycle, there is only one on signal and one off signal. The entire displayed intensity is released from the display in a single burst of energy for that primary. A noncontiguous pulse signal display is capable of being turned on and off more than once during a primary cycle. The total intensity released is the sum of the noncontiguous durations during which it is active. FIG. 11 illustrates the difference between these two approaches to pixel activation.

Referring to FIG. 11, the contiguous pulses may be comparatively simple to drive since all start times match for any given subcycle, e.g., a red subcycle, while only one off signal needs to be sent during the remainder of the subcycle. Alternatively, all stop times may match for any given subcycle with one on signal being applied with the resulting intensity equivalent to the former case. The noncontiguous pulses involve sending additional on and off pulses during the subcycle, as illustrated in the lower half of FIG. 11.

The palette may be increased under either pixel drive schema with the present invention, but the improvement for noncontiguously pulsed pixel signals may vastly outstrip that of the contiguously pulsed pixel drive system. The trade-off is that the electronic overhead to drive pixels using noncontiguous pulsing is more severe than that for contiguous pulsing.

In one embodiment, a given pixel drive schema subdivides each primary into 7 divisions each for red, green, and blue. With seven divisions, eight possible color intensities may be possible (0 through 7 equals 8 total intensities). This may provide a full color palette of 512 colors (8×8×8=512 total combinations of red, green, and blue). Assuming that each primary color may be driven by four lamps, a total of twelve lamps may be provided (4 lamps for each primary times 3 primary colors). Under existing art, palette enhancement would involve increasing the subdivisions into which each primary subcycle is divided. By increasing the subdivisions from 7 to 8, the palette may be increased from 512 to 729 (9×9×9). This change yields an increase in color palette size of just over 42%.

The present invention differs from the current art in providing a 700% improvement in palette size for the preceding example, even though the primary subdivision is moved from 7 to 8 as before. The critical difference lies in the fact that the present invention also controls how many drive lamps are on at any particular point in the primary subcycle. By having only 2 of the 4 lamps on during the first 1/8 of each primary subcycle, the total palette doubles from 512 to 4096. The first of the eight divisions is configured so that drive lamp intensity is half of its full value. This is achieved here by adjusting the number of lamps being turned on, but the present invention embraces alternate methods to achieve the same result. The most obvious alternative being simple intensity adjustment of all lamps, or any hybrid combination of these two approaches. In effect, this adjustment adds an additional binary bit of information to each primary. Since there are three primaries, the total palette increases by the cube of the added binary bit (two to the third power equals eight). The before and after comparison is as follows:

Each primary, original subdivision schema, 7 subdivisions:
0/7, 1/7, 2/7, 3/7, 4/7, 5/7, 6/7, 7/7—total of eight intensities per primary
Total screen palette=8 cubed=512 colors Each primary, existing art palette enhancement, 8 subdivisions:
0/8, 1/8, 2/8, 3/8, 4/8, 5/8, 6/8, 7/8, 8/8—total of nine intensities per primary
Total screen palette=9 cubed=729 colors/42.3% improvement Each primary, present invention, 8 subdivisions with first subdivision at 1/2 lamp intensity:
0/15 through 15/15—total of sixteen intensities per primary
Total screen palette=16 cubed=4096 colors/700% improvement Note that the overall maximum screen output will drop slightly when the present invention is implemented to increase palette size, since the lamp intensity is halved for one eighth of each subcycle. In the above example, this may result in a drop in maximum intensity of 6.25%. Although maximum intensity may have dropped, there may be no change in efficiency, since energy consumption may have dropped by the same amount. Accordingly, this drop may be compensated simply by increasing the energy to the drive lamps by the corresponding factor to offset the intensity drop, with no change in system efficiency.

For contiguously pulsed pixels, additional palette enhancement may be achieved by extending the preceding principles as follows:

(1) To add one binary bit of information, add one subdivision (as in example above), yielding an overall improvement in palette size of 700% (2 cubed) when the lamps are at half intensity during the first subdivision. Total palette size: 4096 colors. Existing art provides 729 colors (9 cubed).

(2) To add two binary bits of information, add three subdivisions to yield an overall improvement in palette size of 6300% (4 cubed) when the lamps are at quarter intensity during the first three subdivisions. Total palette size: 32,768 colors. Existing art provides 1331 colors (11 cubed).

(3) To add three binary bits of information, add seven subdivisions to yield an overall improvement in palette size of 51,200% (8 cubed) when the lamps are at one-eighth intensity during the first seven subdivisions. Total palette size: 262,144 colors. Existing art provides 2744 colors (14 cubed).

By controlling drive lamp intensity and encoding the leading edge of pixel activations to utilize none, part, or all of these fractional lamp intensities, tremendous advances in palette size may be achieved without the commensurate increase in computing power needed to drive currently required in the existing art. Further, there may be a reduction in maximum optical output when the present invention is implemented. Further, since it does not affect efficiency, power compensation to the drive lamps to readjust maximum intensity may not harm device efficiency. The reduction in maximum optical output may vary for each of the above representative scenarios. For example, the reduction in maximum optical output may be 6.25% for case (1) above, 22.5% for case (2) above, and 39.4% for case (3) above. Globally adjusting lamp intensity by these factors will yield the original maximum display intensity without changing energy efficiency. The compensation essentially corrects for the fact that the lamps do not emit at full intensity during the succession of primary subcycles. As before, the reduction of lamp output may be achieved either by altering the quantity of lamps being turned on, or by adjusting input energy to them to reduce their output during the subdivisions during which fractional intensity may be required, or a combination of these two techniques.

Where the intensity of the lamps is controlled by manipulating the number of lamps lit, the present invention also prescribes rotating the off-duty lamps so that overall duty cycle is balanced between all the lamps. For example, in a four lamp per primary system under scenario (1) above, only two of the four lamps are on during the first subdivision. The lamps to remain inactive during these fractional intensity subdivisions should be rotated to balance out their duty cycles, e.g., 1 & 2, then 2 & 4.

Generally, a balance between full intensity subdivisions and fractional intensity subdivisions should be sought. The trade-off is easy to discern. If too many fractional subdivisions are used, the lamps may be required to be driven to high output levels to compensate for the reduction in maximum optical output. While this may be reasonable for all illumination technologies for scenarios (1) through (3) above, this may not be likely to be the case for certain illumination systems.

Figure 12:
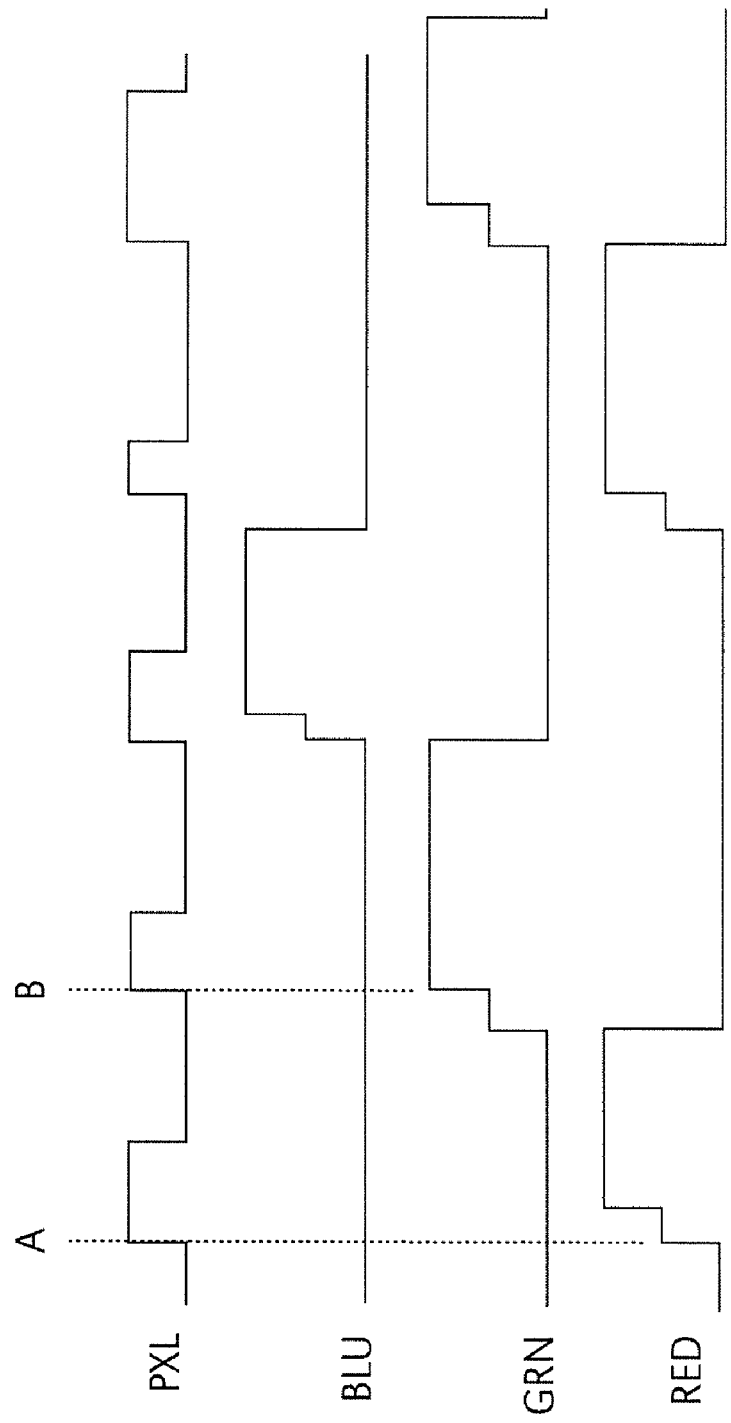
FIG. 12 is an embodiment of the present invention of a timing diagram depicting adding one subdivision to each primary color thereby adding one binary bit to each primary color in a display system incorporating the principles of the present invention.

An illustration of how the present invention's addition of one additional binary bit to each primary is achieved in relation to pixel operation is illustrated in FIG. 12. Referring to FIG. 12, the intensity notch at the leading edge of each lamp on-cycle for each pixel may represent the appropriate encoding of gray scale information to take advantage of the half intensity lamp subdivision. The relative area of the notch may constitute the intensity loss in the system. Since the energy consumption tracks with that intensity, overall efficiency is, as before, unaffected by implementation of the present invention.

For contiguously pulsed pixel systems previously considered, new subdivisions may be added to each primary according to the formula $2^n-1$, for n=1, 2, or 3 additional binary bits per primary in the examples provided. It is noted that n is not limited to these values and these values are illustrative. For the three examples previously discussed, this amounted to adding, respectively, one 1/2 intensity subdivision, or three 1/4 intensity subdivisions, or seven 1/8 intensity subdivisions. Since the pixel pulses are contiguous (only one pixel-on and pixel-off signal per primary subcycle), the formula holds.

If the pixels can be pulsed noncontiguously, however, there are superior ways for achieving increases in the binary bit depth of the primary gray scales. There may be no actual difference for achieving an improvement of only one binary bit per primary, since by definition the 1/2 intensity subdivision, being only one in number, is in fact contiguous to the full intensity lamp pulse that follows it. However, for the 2-bit and 3-bit per primary palette enlargement schemas, the improvement clearly follows. To provide a 2-bit per primary improvement in a noncontiguously pulsed display, two subdivisions may be added (rather than three as in the contiguous case), but the lamp intensities for these two divisions are 1/4 and 1/2 intensity, respectively. In the 3-bit per primary enhancement, three subdivisions (rather than seven) may be added, but the lamp intensities for these three divisions are 1/8, 1/4, and 1/2 intensity, respectively. As before, lamp intensity may be subdivided either by controlling how many lamps are on, or by modulating the energy provided to illuminate them, or a combination of these two techniques.

The importance of noncontiguous pulsing of pixels becomes clear, particularly in the case last described. The first three subdivisions, during which the lamps are at 1/8, 1/4, and 1/2 intensity, may be combined in different combinations to achieve any value of the form n/8, where n<8. However, only half of the combinations (0, 1/2, 3/4, and 7/8) may be achieved with contiguous pulsing. The other values (1/8, 1/4, 3/8 and 5/8) require noncontiguous pulsing in order to prevent the pixel from being on during undesired subdivisions. In this example, pixel activation/deactivation may occur up to twice per primary subcycle in order to produce all available colors in the enhanced palette. If the palette is expanded by adding an additional subdivision at 1/16 intensity (4 total additional binary bits per primary color), additional on-off cycles per primary subdivision may be required in order to generate all sixteen fractional values during the first four subdivisions.

As in the contiguous pulsed case, real time conversion of incoming gray scale values to the appropriate pixel activation sequence during each primary color subcycle may be configured to take advantage of the present invention herein disclosed. It is significant that noncontiguous pulsing expands the color palette with a lower impact on maximum screen intensity, thus requiring less compensation at the drive lamp input side. As before, overall efficiency may not be affected by either variant of the present invention.

Both variants demonstrate vastly superior palette enhancement over the existing art for all sequential color displays that use any form of pulse modulation. It is noted that the technique may be applied to amplitude modulated field sequential color if temporal control of pixel amplitude may be synchronized to fractional backlight intensities analogous to those illustrated in FIG. 12.

Technique to Create Air Gaps and Standoff Structures Without Elaborate Interlayer Registration As stated in the Background Information section, creating stand-off structures in the MEMS industry involves complicated multi-layer work, where all manner of multiple sub-steps and invocation of so-called "sacrificial" layers is required. Creating "valleys" below the level of "plateaus" is a key component in many micromechanical systems. Valleys provide mechanical degrees of freedom in which other elements, which might be ultimately anchored to the plateau, may undergo controlled motion. These "air gaps" are often the key to many MEMS-based devices, but their fabrication remains a complicated process.

MEMS may further require standoffs that are precision registered. In systems such as the Frustrated Total Internal Reflection Display System disclosed in U.S. Pat. No. 5,319, 491, this requirement becomes more acute in light of the larger area covered by highly detailed MEMS structures, which become increasingly susceptible to misregistration effects during fabrication. Therefore, a simpler fabrication mechanism is called for, preferably one in which sacrificial layers are essentially self-sacrificing without additional fabrication steps being required to generate the standoffs and interstitial air gaps between them as addressed by the present invention discussed below.

Figure 13:
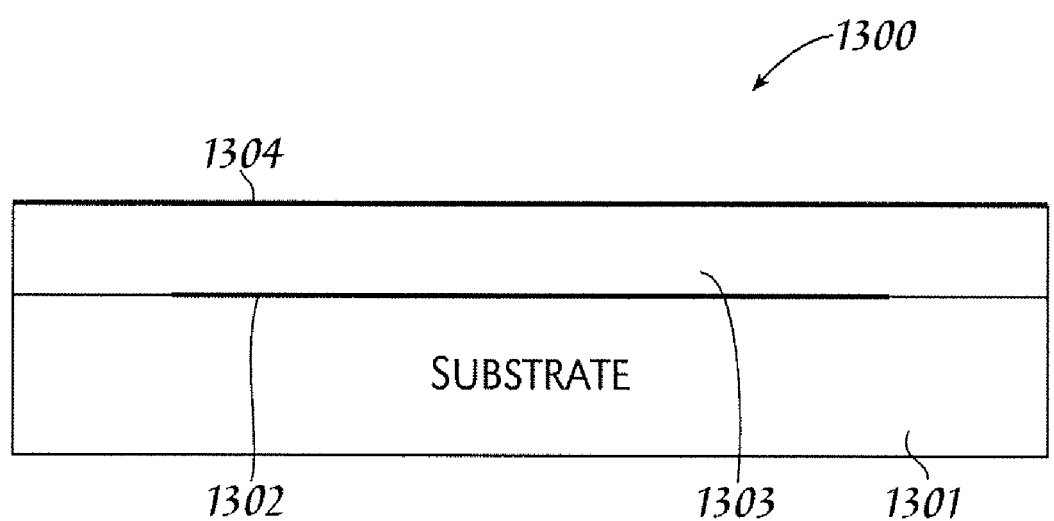
FIG. 13 illustrates an embodiment of the present invention of a cross-section of a patterned pixel feature.
Figure 15:
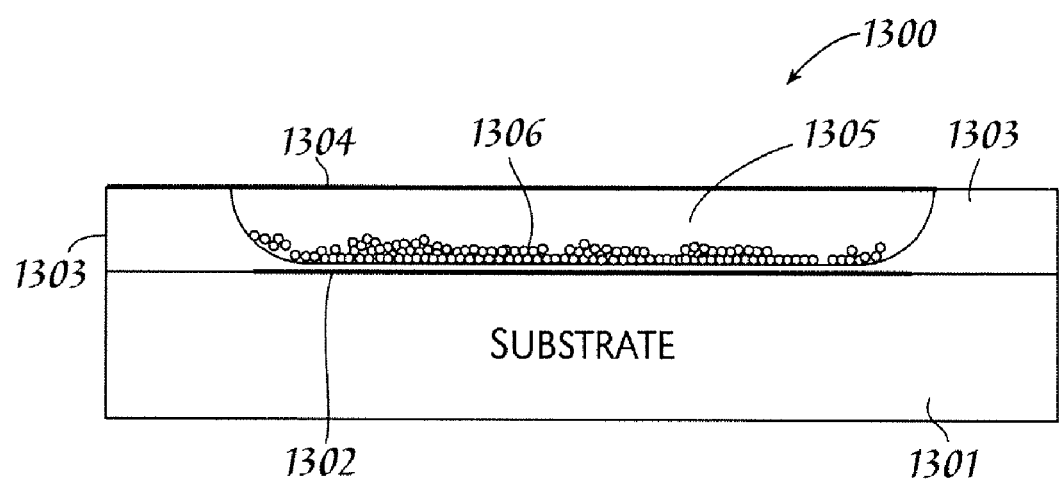
FIG. 15 illustrates an embodiment of the present invention of restoring the position of the ground plane to its original position.

FIG. 13 illustrates an embodiment of the present invention of a cross-section of a patterned pixel feature 1300. Patterned pixel feature 1300 may comprise a substrate 1301 formed of various well known light guiding materials, e.g., Lucite, of high refractive index. Disposed on the upper surface of substrate 1301 may be a patterned electrode 1302. Disposed on the upper surface of patterned electrode 1302 may be an aerogel 1303. In one embodiment, aerogel 1303 may be a tetramethoxysilane aerogel that is between 0.8 µm and 1.1 µm in thickness. Disposed on the upper layer of aerogel 1303 may be a contiguous ground plane 1304 such as ground plane 301 (FIGS. 3 and 4). Accordingly, the electrical gap is small enough to allow considerable mechanical force to be developed using electrostatic means without exceeding the dielectric strength of aerogel 1303. Upon applying a potential between electrode 1302 and ground plane 1304, ground plane 1304 may be attracted towards electrode 1302 which, under specified conditions, may be capable of crushing aerogel 1303 into a benign powder 1306 as illustrated in FIGS. 14 and 15. The crushing of aerogel 1303 may be able to create one or more voids 1305. Since the constituent particles of aerogel 1303 may be significantly smaller than the wavelength of light, the crushing of aerogel 1303 may have no deleterious effect on pixel's 1300 operation. Regions of aerogel 1303 which are not crushed may maintain their structural integrity since applied forces never exceeded their yield strength in either shear or compression. Hence, the remaining uncrushed regions of aerogel 1303 may optionally serve as a resulting standoff. Contiguous ground plane 1304 above the air gap generally has a superadded elastomer or equivalent to provide restoring force for continuous mechanical actuation as illustrated in FIG. 15, and the elastomer may even be disposed on the surface of the contiguous ground plane 1304 facing aerogel 1303.

The present invention may be configured for systems of any lateral complexity so long as their cross-sectional dimensions fall within the proper range for electrically controlled compression of the sacrificial layer to be pulverized. It is therefore extensible to a wide range of MEMS applications. Further, it may be generalized to systems not specifically using an aerogel, but any material capable of in situ self-sacrifice under compressive strain applied according to an appropriate profile.

The generation of air gaps according to the present invention may not likely to be a single step process, but rather may be likely to take a matter of minutes, hours, or longer, depending on the mechanical properties of the self-sacrificing layer. The process of ultimately crushing this layer generally proceeds exponentially, advancing from apparent non-motion during the vast majority of the process to rapid destruction of the sacrificial layer during the last 1-3% of the process, insofar as duration is concerned. The voltages required to generate air gaps are likely to be far higher than for standard device operation (operation after the airgap has been created). The signal profile, frequency rate, and voltage may be determined by the mechanical and electrical properties of the sacrificial layer. Square waves with extremely high slew rates provide the best results as opposed to other signal profiles. Frequencies should be commensurate with clean square wave generation, and should allow springback of the moving element, e.g., ground plane 1304, with any associated superimposed elastomer above or below it to enhance net momentum transfer to the layer to be crushed, e.g., aerogel 1303.

It should be appreciated that traditional sacrificial layers may often be removed using chemical etching compounds that invade the interior of open MEMS devices. These etching compounds may be targeted to attack only the sacrificial layer and not the surrounding structures. Unimpeded transport of the compound to the sacrificial layer, and exhausting of the byproducts of the etching process away from the MEMS structure, are presupposed. Where neither of these factors is present, the present invention may provide an alternate mechanism for achieving the same results for systems that lend themselves to its unique approach to registration-free standoff and air gap construction. Although U.S. Pat. No. 5,319,491 may be a suitable candidate for implementation of generating air gaps, the present invention is not limited to that application.

The following is a list of criteria that may be required to generate air gaps and standoff structures without elaborate interlayer registration. It may be required for pixel 1300 to have intrinsic means to crush the self-sacrificing layer, e.g., aerogel 1303. Another criterion may be that the force gradient during normal operation is such that the crushing of the self-sacrificing layer is self-limiting, such that the lateral transition zone from void center to void perimeter (from crushed to semi-crushed to uncrushed standoff) will not exhibit mechanical instability that would lead to a loss of structural integrity. Further, the forces applied to the non-crushed regions may have to be configured to fall under any such deleterious threshold. Alternately, contiguous post-processing steps that enhance the mechanical integrity of the post-generated air gaps and standoffs may be applied to secure this end, e.g., ultraviolet irradiation to further cure compounds amenable to such processing. Alternatively, as a more complex variation, pre-processing the self-sacrificing layer to make it anisotropic (weaker in the void regions, stronger elsewhere) may be imposed, which would introduce the potential necessity for registration and positioning means that may be otherwise obviated by the present invention. The pre-processing or pre-biasing of the self-sacrificing layer may be achieved by chemical, electrical, irradiative, thermal, or other means, alone or in combination, or achieved by exploitation of time-varying properties, whether global or local to the pixel vicinities, exhibited by the layer during or after its fabrication. Further, the system in which air gaps and standoff structures are generated may be required to be immune to any ill effects from either the presence, or potential dispersion, of the residue arising from this process.

Figure 2A:
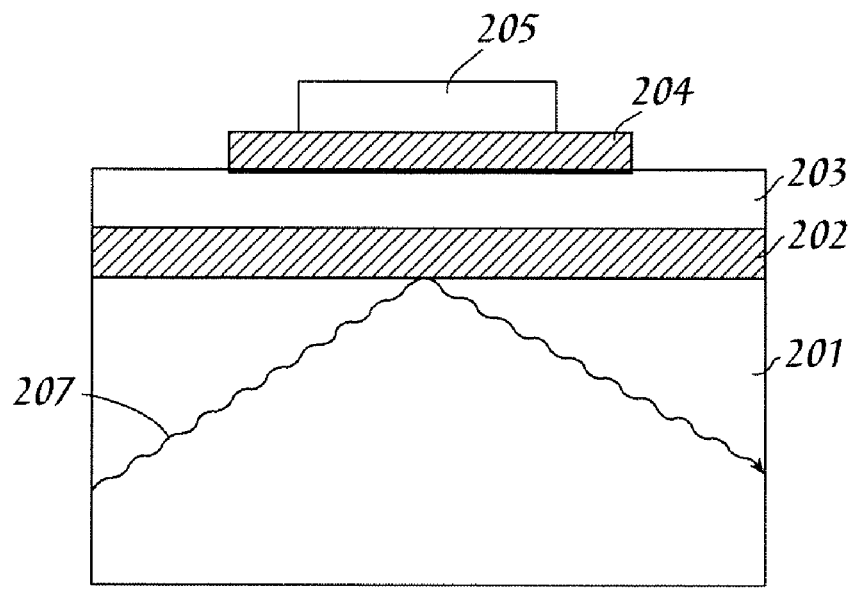
FIG. 2A illustrates a side view of a pixel in a deactivated state.
Figure 2B:
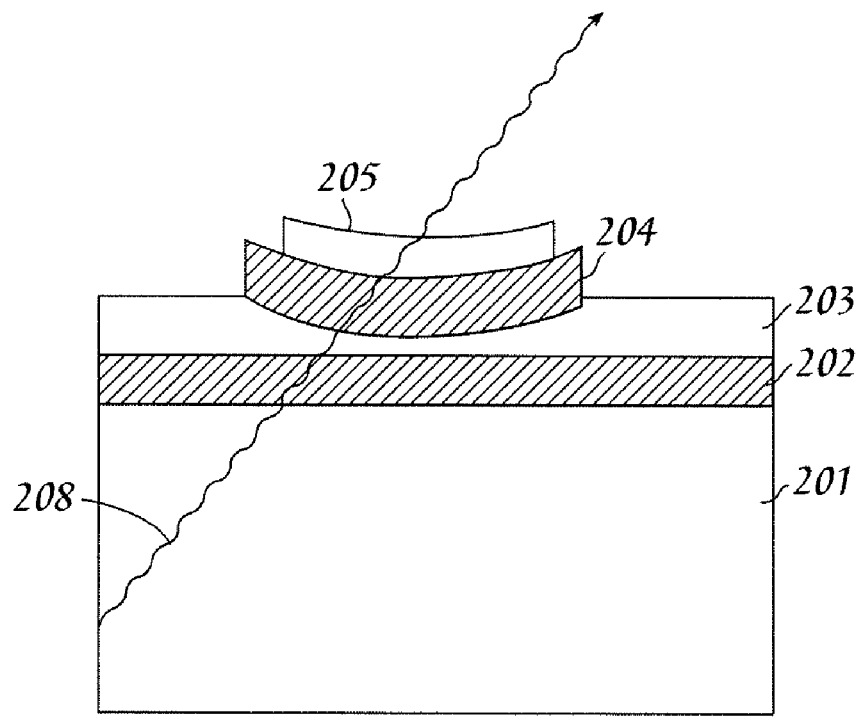
FIG. 2B illustrates a side view of a pixel in an activated state.
Figure 16:
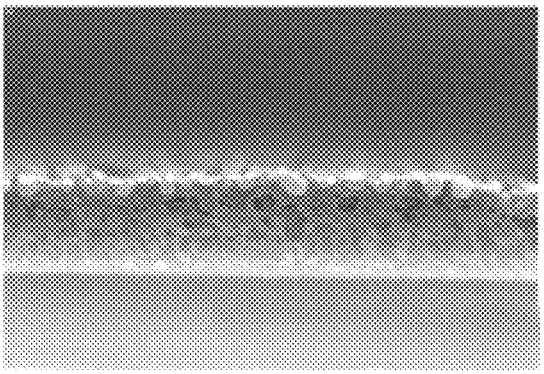
FIG. 16 illustrates an embodiment of the present invention of generating air gaps and standoff structures being applied to an aerogel substrate one micron thick.
Figure 16:
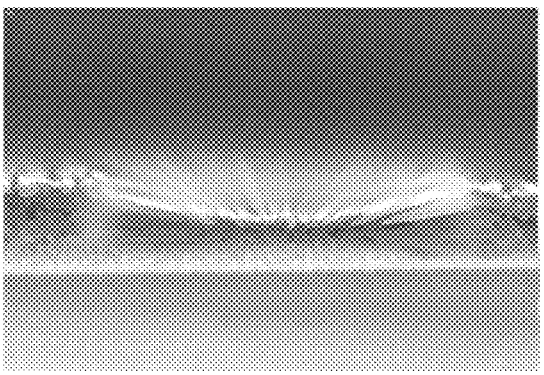
Figure 16:
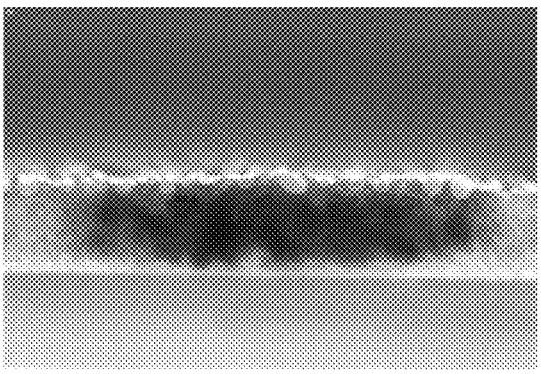

An illustration of generating air gaps and standoff structures being applied to an aerogel substrate one micron thick is illustrated in FIG. 16. The fundamental principle is identical to that set forth in FIGS. 13-15 except FIG. 16 illustrates actual components rather than line art idealizations. The choice of aerogel is, in this example, driven by its ultra-low refractive index, by which it serves as an ideal cladding layer for a frustrated total internal reflection pixel mechanism utilizing the fourth embodiment of U.S. Pat. No. 5,319,491 that invokes evanescent coupling to emit light from the guidance substrate. It should be appreciated that this enhancement is effectively a variation of the device shown in FIGS. 2A and 2B, corresponding to FIGS. 16 and 17, respectively, of U.S.

Pat. No. 5,319,491, where elastomer layer 203 is replaced with aerogel (which satisfies the optical requirements for that layer) which is subsequently crushed in the pixel vicinity to form an air gap (which still satisfies the optical requirements for that layer), allowing free excursion of the high refractive index region 205 into the evanescent field by plate bending motion peripherally supported by the uncrushed aerogel, without continuously compressing layer 203, which has been effectively self-sacrificed in the pixel vicinity under this heading.

Although the method, circuits, mechanisms and apparatuses are described in connection with several embodiments, it is not intended to be limited to the specific forms set forth herein; but on the contrary, it is intended to cover such alternatives, modifications and equivalents, as can be reasonably included within the spirit and scope of the invention. It is noted that the headings are used only for organizational purposes and not meant to limit the scope of the description or claims.

The invention claimed is:

1. A method for extending a color gamut comprising:
   generating red, green and blue light using respective first light sources, said red, green and blue light having a color space represented by a tristimulus color space triangle;
   adding light of an additional color located outside said tristimulus color space triangle to said red, green and blue light to provide light having a color space represented by an extended-gamut polygon having a non-tristimulus vertex, said adding comprising generating said light of said additional color using a second light source; and
   modulating said light emitted by both said first light sources lying inside said tristimulus color space triangle and said light source lying outside said tristimulus color space triangle;
   wherein said generating said light of said additional color comprises combining light from light sources generating light of colors that chromatically sum to said additional color based on their weighted intensities.

2. The method as recited in claim 1, wherein said additional color is located outside said tristimulus color space triangle but within a CIE International Commission on Illumination) color space.

3. The method as recited in claim 2, wherein said non-tristimulus vertex added to construct said extended-gamut polygon is located within said CIE color space.

4. The method as recited in claim 2, wherein said modulating comprises modulating said light emitted by both said first light sources located inside said tristimulus color space triangle and said second light source located outside said tristimulus color space triangle but within said CIE (International Commission on Illumination) color space using pixel structures.

5. The method as recited in claim 4, wherein:
   said adding comprises adding light of one or more additional colors located outside said tristimulus color space triangle to said red, green and blue light to provide said light having a color space represented by an extended-gamut polygon having a respective non-tristimulus vertex corresponding to each of said additional colors; and
   a frequency and a duration of pulses of said pixel structures are temporally proportioned to and synchronized with the number of additional colors of light located outside said tristimulus color space triangle but within said CIE color space.

6. The method as recited in claim 5, wherein at least one pulse width of a first of said colors is not of identical duration to at least one pulse width of a second of said colors, wherein said first and second colors are located within said CIE color space.

7. The method as recited in claim 5, wherein a pulse width for each color located inside and outside said tristimulus color space triangle but within said CIE color space is of identical duration.

8. A method for extending a color gamut comprising:
   generating red, green and blue light using respective first light sources, said red, green and blue light having a color space represented by a tristimulus color space triangle;
   adding light of an additional color located outside said tristimulus color space triangle to said red, green and blue light to provide light having a color space represented by an extended-gamut polygon having a non-tristimulus vertex, said adding comprising generating said light of said additional color using a second light source;
   driving both said first light sources lying inside said tristimulus color space triangle and said second light source lying outside said tristimulus color space triangle to provide light to a plurality of pixels, wherein a frequency and a duration of light pulses, from said first light sources, are temporally proportioned to and synchronized with said second light source; and
   modulating said light emitted by both said first light sources lying inside said tristimulus color space triangle and said second light source lying outside said tristimulus color space triangle.

9. The method as recited in claim 8, wherein said additional color is located outside said tristimulus color space triangle but within a CIE (International Commission on Illumination) color space.

10. The method as recited in claim 9, wherein said non-tristimulus vertex added to construct said extended-gamut polygon is located within said CIE (International Commission on Illumination) color space.

11. The method as recited in claim 9, wherein said modulating comprises modulating, by pixels, said light emitted by both said first light sources located inside said tristimulus color space triangle and said second light source located outside said tristimulus color space triangle but within said CIE (International Commission on Illumination) color space.

12. The method as recited in claim 9, wherein at least one pulse width of a first primary color is not of identical duration to at least one pulse width of a second primary color, wherein said first and second primary colors lie within said CIE color space.

13. The method as recited in claim 9, wherein a pulse width for each primary color lying within said CIE color space is of identical duration.

14. The method as recited in claim 8, wherein said generating said light of said additional color comprises combining light from light sources generating light of colors that chromatically sum up to said additional color based on their weighted intensities.

* * * * *